US010870604B2

(12) United States Patent
Fang et al.

(10) Patent No.: US 10,870,604 B2
(45) Date of Patent: Dec. 22, 2020

(54) POLYMER-MODIFIED HYBRID MICRO-FIBER CEMENTITIOUS COMPOSITE MATERIAL

(71) Applicant: Nano and Advanced Materials Institute Limited, Hong Kong (HK)

(72) Inventors: Shuai Fang, Hong Kong (HK); Yuet Kee Lam, Hong Kong (HK); Man Lung Sham, Hong Kong (HK); Honggang Zhu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 0 days.

(21) Appl. No.: 16/680,511

(22) Filed: Nov. 12, 2019

(65) Prior Publication Data
US 2020/0157006 A1    May 21, 2020

Related U.S. Application Data

(60) Provisional application No. 62/770,173, filed on Nov. 20, 2018.

(51) Int. Cl.
*C04B 28/04* (2006.01)
*C04B 14/28* (2006.01)
(Continued)

(52) U.S. Cl.
CPC .............. *C04B 28/04* (2013.01); *C04B 14/06* (2013.01); *C04B 14/28* (2013.01); *C04B 14/48* (2013.01); *C04B 20/1033* (2013.01); *C04B 20/1062* (2013.01); *C04B 20/123* (2013.01); *C04B 24/2641* (2013.01); *E04G 23/0218* (2013.01);
(Continued)

(58) Field of Classification Search
CPC ......... C04B 28/04; C04B 14/06; C04B 14/28; C04B 14/48; C04B 20/1033; C04B 20/1062; C04B 20/123; C04B 24/2641; C04B 2103/32; C04B 2111/723; C04B 2201/50; E04G 23/0218; E04G 2023/0251; E04B 1/21
See application file for complete search history.

(56) References Cited

U.S. PATENT DOCUMENTS

2011/0268953 A1 *  11/2011  Sorger .................... C04B 28/02
                                                         428/220

* cited by examiner

*Primary Examiner* — William K Cheung
(74) *Attorney, Agent, or Firm* — Idea Intellectual Limited; Margaret A. Burke; Sam T. Yip

(57) ABSTRACT

A polymer-modified hybrid-fibers cementitious composition has a one-day compressive strength of at least approximately 17 MPa, a 28-day tensile strength of at least approximately 3.8 MPa, an ultimate tensile strain of approximately 3% to approximately 9%, and a 7-day bond strength of at least approximately 2.3 MPa. A binder of ordinary Portland cement, fly ash, and silica fume is provided. Other components include limestone powder, sand, superplasticizer, and water. The composition further includes one or more of styrene butadiene rubber or ethylene-vinyl acetate copolymer in an amount ranging between approximately 2% and approximately 8% by mass of binder. Fiber additives include steel fibers in an amount ranging between approximately 0.3% and approximately 3.0% by volume of the cementitious composition and polymer fibers in an amount less than approximately 1.0% by volume of the cementitious composition. Chamfers made of the composition are positioned at beam-column joints.

8 Claims, 28 Drawing Sheets

(51) Int. Cl.
 _C04B 14/06_ (2006.01)
 _C04B 14/48_ (2006.01)
 _E04B 1/21_ (2006.01)
 _C04B 20/10_ (2006.01)
 _C04B 24/26_ (2006.01)
 _E04G 23/02_ (2006.01)
 _C04B 20/12_ (2006.01)
 _C04B 103/32_ (2006.01)
 _C04B 111/72_ (2006.01)
(52) U.S. Cl.
 CPC ..... _C04B 2103/32_ (2013.01); _C04B 2111/723_ (2013.01); _C04B 2201/50_ (2013.01); _E04B 1/21_ (2013.01); _E04G 2023/0251_ (2013.01)

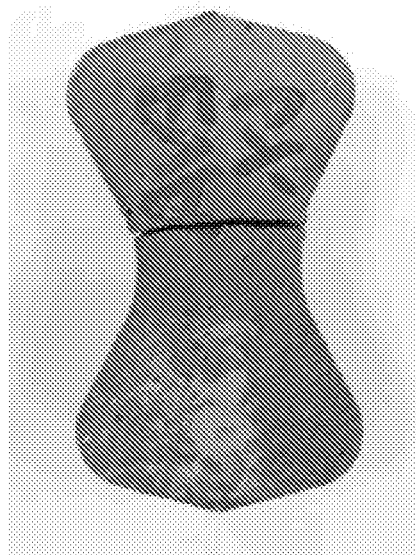 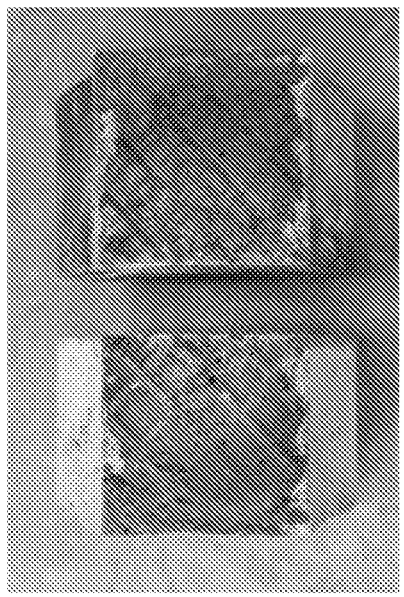
FIG. 12A          FIG. 12B
FIG. 13

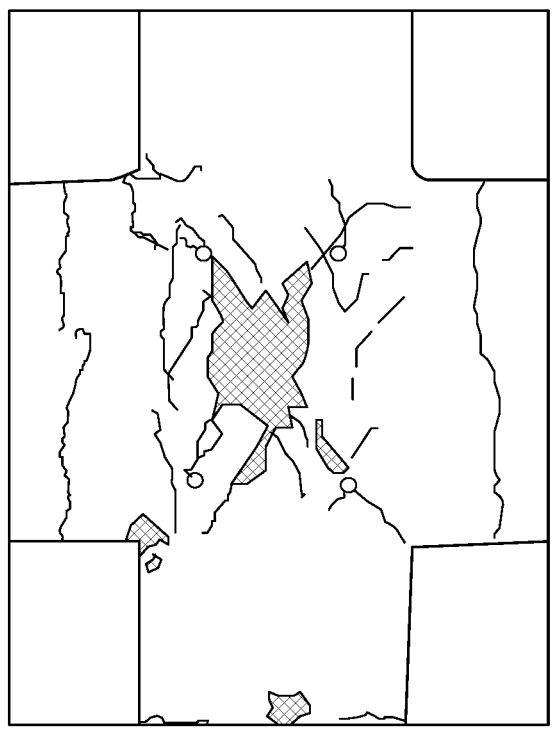
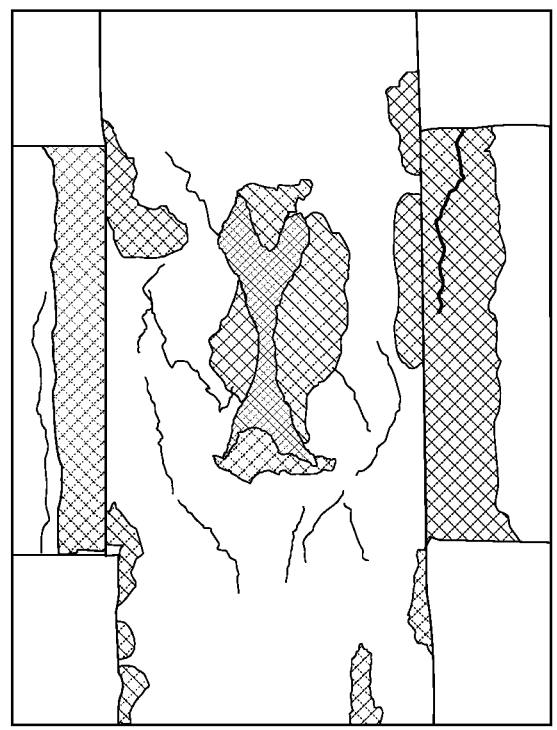
FIG. 20A　　　　　　　　　　FIG. 20B
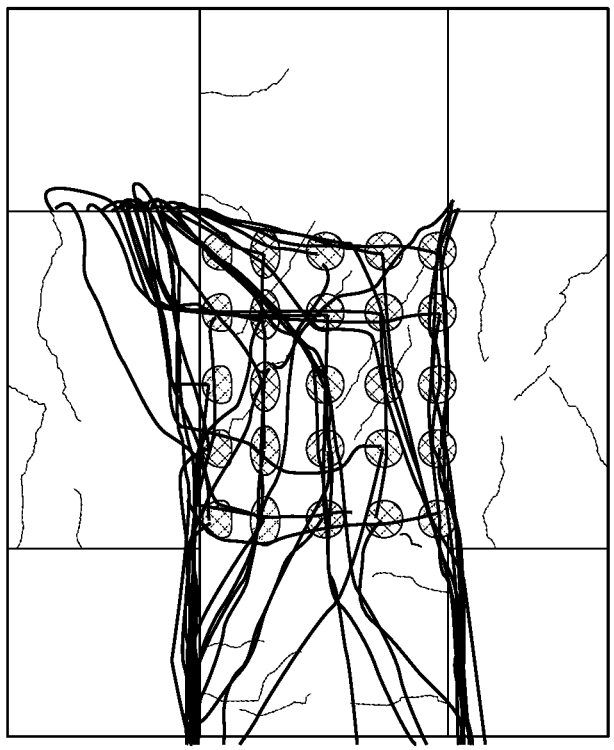
FIG. 21

US 10,870,604 B2

POLYMER-MODIFIED HYBRID MICRO-FIBER CEMENTITIOUS COMPOSITE MATERIAL

CROSS-REFERENCE TO RELATED APPLICATIONS

This application claims priority from the U.S. Provisional Patent Application Ser. No. 62/770,173 filed Nov. 20, 2018, and the disclosure of which is incorporated herein by reference in its entirety.

FIELD OF THE INVENTION

The present invention relates to improved repair mortars and structures implemented by improved repair mortars that can strengthen the beam-column joints in older concrete structures.

BACKGROUND

Older reinforced concrete buildings may have beam-column joints (BCJs) that lack transverse reinforcements; these beam-column joints have limited shear capacity and limited ductility. In Hong Kong, building codes prior to 2004 did not require transverse reinforcements. In major alteration and addition (A&A) works, the pre-2004 BCJs have to overcome both the deficiency in transverse reinforcements and the additional floor loading. The latter incurs additional force to the BCJs. Demolishing and re-constructing these existing buildings would generate substantial construction waste and pose environmental concerns. Therefore, upgrading the beam-column joints to enhance shear capacity and ductility and to withstand the additional load is required. However, existing repair mortars lack the necessary combined strength and ductility to reinforce these beam-column joints. Therefore, there is a need in the art for improved repair mortars and structures implemented by improved repair mortars that can strengthen the beam-column joints in older concrete structures.

SUMMARY OF THE INVENTION

The present invention provides a polymer-modified hybrid fibers cementitious composition having a one-day compressive strength of at least approximately 17 MPa, a 28-day tensile strength of at least approximately 3.8 MPa, an ultimate tensile strain of approximately 3% to approximately 9%, and a 7-day bond strength of at least approximately 2.3 MPa. The composition includes a binder of ordinary Portland cement, fly ash, and silica fume. Other components include limestone powder, sand, superplasticizer and water. The composition further including polymer additives. The additives include one or more of styrene butadiene rubber or ethylene-vinyl acetate copolymer in an amount ranging between approximately 2% and approximately 8% by mass of binder. Fiber additives are also provided. The fiber additives include steel fibers in an amount ranging between approximately 0.3% and approximately 3.0% by volume of the cementitious composition and polymer fibers in an amount ranging between approximately 0.8% and approximately 1.0% by volume of the cementitious composition.

In another aspect, a repaired concrete structure is provided. The repaired concrete structure includes a concrete beam-column joint and a chamfer positioned on the beam-column joint. The chamfer fills the approximately right-angled intersection between a beam and a column, creating an approximately diagonal surface extending between the beam and the column. The chamfer is made from a hardened repair mortar. The repair mortar includes a binder of ordinary Portland cement, fly ash, and silica fume. The repair mortar further includes limestone powder, sand and polymer additives. The polymer additives are one or more of styrene butadiene rubber or ethylene-vinyl acetate copolymer. Fiber additives include steel fibers and polymer fibers.

BRIEF DESCRIPTION OF THE DRAWINGS

FIG. 4A is the result of the control; FIG. 4B is the result of the specimen B1; FIG. 4C is the result of the specimen B2; FIG. 4D is the result of the specimen B3; FIG. 4E is the result of the specimen C1; FIG. 4F is the result of the specimen C2; FIG. 4G is the result of the specimen C3; FIG. 4H is the result of the specimen PE1;

FIG. 5A is for the control; FIG. 5B is for the sample B1; FIG. 5C is for the sample C1; FIG. 5D is for the sample PE1;

FIG. 6A is for the formulation PE1SF1; FIG. 6B is for the formulation PE1SF0.5; FIG. 6C is for the formulation PE0.8SF0.3;

FIG. 7A is for the formulation PE1SF1; FIG. 7B is for the formulation PE1SF0.5; FIG. 7C is for the formulation PE0.8SF0.3;

FIG. 12A shows the result of the tensile test of the specimens;

FIG. 12B shows the result of the bond test of the specimens;

FIG. 13 depicts a mortar primer coated on a specimen interface;

FIG. 17A: removing concrete cover of beams and columns with $L_C$ from joint; FIG. 17B: chiseling surface of exposed concrete by an impact hammer followed by cleaning with compressed air; FIG. 17C: damping surface of exposed concrete and painting thereof by primer; FIG. 17D: fixing formwork on specimen IJ-C150FM, wherein the repair mortar is cast into the formwork and compacted by a wooden hammer; FIG. 17E: the repair mortar is cast and compacted by hammering the formwork of specimen IJ-C150FMN, where the formwork is then lifted until the repair mortar contacts bottom of the beam; FIG. 17F: dismantling the formwork 24 hours after casting;

FIGS. 20A-20B are photographs showing crack pattern and failure mode of a beam-column joint without transverse reinforcements: FIG. 20A is the front view of the beam-column joint; FIG. 20B is the back view of the beam-column joint;

FIG. 21 shows the crack pattern and failure mode of a beam-column joint with transverse reinforcements;

DETAILED DESCRIPTION

Repair Mortar

Figure 1:
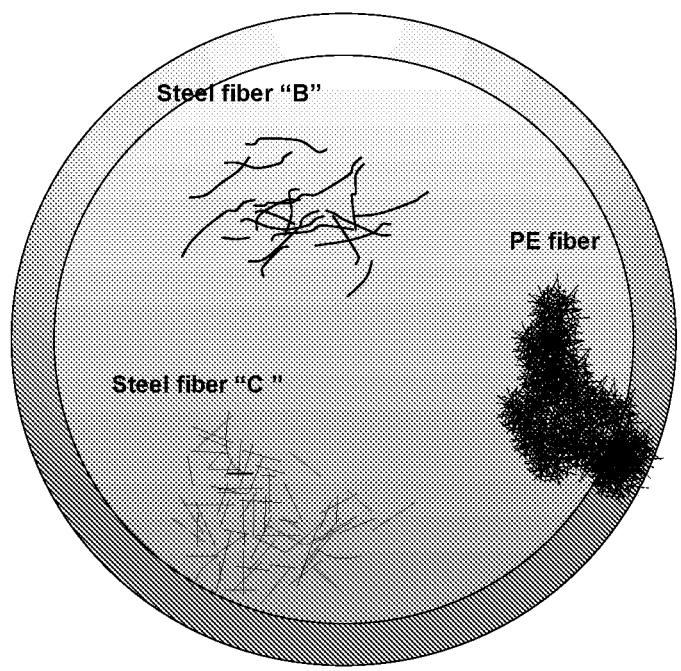
FIG. 1 depicts fibers for use in the repair mortars of the present invention.

Addition of chamfers to beam-column joints is an effective and less-disruptive technique to strengthen the beam-column joints, thereby enlarging concrete struts in joint zones and relocating plastic hinges away from the joints. However, conventional cement-based mortars are prone to cracking under tension due to low tensile strength. Following cracking, the conventional mortar can no longer resist tensile stress. As a result, the cracked chamfers cannot contribute to part of load transfer between reinforced concrete beams and columns. Therefore, the present invention provides an innovative polymer-modified hybrid micro-fiber repair mortar (named as PHMRM hereafter) to form high-performance chamfers. The novel repair mortar attains superior mechanical properties to enhance joint shear capacity and high deformation capacity to facilitate energy dissipation.

The repair mortar of the present invention includes a binder phase of ordinary Portland cement, fly ash, and silica fume. The binder phase chemically reacts with water to harden the resultant mortar. In general, hydraulic reactions involve calcium, silica, and alumina ingredients. Reaction products, when introduced to water, include calcium silicates and calcium aluminate hydrates. Portland cement is a type of hydraulic cement that typically includes calcium oxides, silica, and alumina in various proportions. Compositions of Portland cement may include CaO in a range of 61-67%, $SiO_2$ in a range of 19-23%, $Al_2O_3$ in a range of 2.5-6%, $Fe_2O_3$ in a range of 0-6% and sulfate in a range of 1.5-4.5%.

Various compositions of Portland cement are set forth in ASTM C150/C150M-16e1 "Standard Specification for Portland Cement", available from ASTM International, West Conshohocken, Pa., 2016, the disclosure of which is incorporated by reference herein. Any of these compositions may be used as the hydraulic binder of the present invention.

Fly ash is the leftover product of coal combustion. The range of components depends on the composition of the coal that was burned and tends to be regionally-specific. The main components of fly ash are silicon dioxide ($SiO_2$) in an amount from 20-60 weight percent, aluminium oxide ($Al_2O_3$) in an amount from 5 to 35 weight percent and calcium oxide (CaO) in an amount from 1 to 40 weight percent. Iron oxide ($Fe_2O_3$) may also be present in an amount from 4 to 40 percent. Note that the materials such as fly ash have variable compositions because they are waste materials and, as such, come from a wide variety of sources. Therefore, the above compositions are merely exemplary of material compositions.

In order to create a high-strength repair mortar, silica fume is included in the composition. Silica fume is typically amorphous silicon dioxide with a fine particle size on the order of 100-300 nm. Silica fume acts as a pozzolan in the repair mortar, that is, a material that, in the presence of water, can react chemically with calcium hydroxide to form a cementitious material. As a result of this chemical reaction, the resultant mortar has an increased strength. The amount of silica fume may be selected depending upon the desired strength of the repair mortar. The amount selected may be approximately 2.5 weight percent or less.

Limestone may be added to the repair mortar composition in an amount equal to or less than approximately 9 weight percent. Limestone may improve the workability of the repair mortar. Further, limestone may prevent sand/binder separation and reduce shrinkage cracking. The limestone may act as a seed crystal for the binder phase, better distributing the reaction products and increasing the reactivity of the cement.

Aggregate, the structural filler of the repair mortar, provides compressive strength and bulk to the repair mortar and may be chosen based on the desired durability, strength, and workability of the repair mortar. The repair mortar of the present disclosure may include sand and/or lightweight aggregate in varying amounts. A total amount of aggregate may range from approximately 25 weight percent to approximately 33 weight percent. In an exemplary embodiment, river sand having a particle size less than approximately 2.36 mm is used as the aggregate/filler in an amount of approximately 25 weight percent.

A superplasticizer in an amount from approximately 0.17 weight percent to approximately 0.24 weight percent may be included in the repair mortar composition. "Superplasticizer," as used herein, refers to materials used to disperse cement agglomerates. Superplasticizers may be polycarboxylate-based polymers such as polycarboxylate ether-based polymers.

Polymeric materials may be added to the repair mortar in order to increase the bonding strength of the repair mortar. Polymeric materials may also enhance the cohesiveness of the binder, reducing cracking during drying, and increase the ductility and ultimate tensile strain. The polymer additives may include one or more of styrene butadiene rubber or ethylene-vinyl acetate copolymer in an amount ranging between approximately 2 percent and approximately 8% by mass of the binder.

Fiber additives may be used to increase the tensile strength of the repair mortar. Steel fibers may be added in an amount ranging between approximately 0.3 percent and approximately 3.0 percent by volume of the repair mortar. Polymer fibers may help reduce drying cracking of the repair mortar. Polyethylene fibers may be used as the polymer fibers in an amount ranging from approximately 0.8 volume percent and approximately 1.0 volume percent of the repair mortar.

Example 1: Repair Mortar Compositions

To achieve a one-day compressive strength of 15 MPa, a water-to-binder ratio of 0.35 was selected. Since a larger amount of binder phase is beneficial to disperse fibers in the mortar, the binder-to-aggregate ratio was set at 1.5. Ordinary Portland cement was used as the main binder. According to Concrete Code 2013, fly ash and silica fume can be used to replace Portland cement partially to reduce hydration heat and improve strength. The code recommends a range of substitution of 25% to 35% for fly ash, and less than 6% for silica fume by mass of binder, respectively. In this example, the fly ash ranges from 25% to 35% and the silica is 5% by mass of binder. River sand and limestone powder were used as aggregate. Grace ADVA 109 superplasticizer was employed to adjust workability of mortar. As shown in Table 1, three formulations of repair mortar were tested.

TABLE 1

Formulas of cement-based mortar (kg/m$^3$)

| Formula | F1 | F2 | F3 |
| --- | --- | --- | --- |
| Cement | 623 | 623 | 728 |
| Fly ash | 364 | 364 | 260 |
| Silica fume | 52 | 52 | 52 |

TABLE 1-continued

Formulas of cement-based mortar (kg/m$^3$)

| Formula | F1 | F2 | F3 |
| --- | --- | --- | --- |
| Limestone powder | 0 | 177 | 177 |
| Sand | 697 | 520 | 520 |
| Water | 364 | 364 | 364 |
| Superplasticizer | 3.6 | 3.6 | 3.6 |
| Water-to-binder ratio | | 0.35 | |
| Binder-to-aggregate ratio | | 1.5 | |

In each formulation, three cubic specimens with dimension of 70×70×70 mm were prepared for one-day compressive strength test. The procedure of preparing the repair mortar specimens is described as follows:

Place ordinary Portland cement, fly ash, silica fume, water and superplasticizer in a mixer and mix them for 30 seconds at low speed. Add sand during mixing. Shift the mixer to medium speed and mix the mortar for 30 seconds. Suspend the mixing and scrape down the mortar on sides of the bowl. Mix the mortar for another 60 seconds at medium speed.

Cast the mortar into molds and compact it using a vibrating table.

The specimens are removed from molds 24 hours after casting, and then subjected to compression test.

Loading rate of the compression test was 0.6 MPa/s. The test was terminated when the compressive load reduced to 85% of its maximum. Measured one-day compressive strength of the repair mortar is given in Table 2.

TABLE 2

One-day compressive strength of cement-based mortar (MPa)

| Formulation | F1 | F2 | F3 |
| --- | --- | --- | --- |
| one-day | 22.8 | 24.8 | 25.0 |
| compressive | 23.7 | 24.0 | 25.2 |
| strength | 23.7 | 24.1 | 24.4 |
| Average | 23.4 | 24.3 | 24.9 |

From Table 2, it is observed that all the mortar formulations achieved the target one-day compressive strength of at least 15 MPa. The mortar formulation F2, which contains limestone powder, demonstrates slightly improved compressive strength. It is likely due to the high fineness of limestone powder that fills the pores in the mortar. Compared to F1, the formulation F3 has a higher cement content, resulting in higher one-day compressive strength. Further increase in the cement proportion may lead to high hydration heat and shrinkage of mortar. Therefore, formulation F3 was selected as the composition for further testing.

As the fiber additive, two types of steel fibers, bare steel fiber ("B") and copper-coated steel fiber ("C"), and one type of polyethylene fiber ("PE") are used to reinforce the mortar as shown in FIG. 1. Physical properties of steel fibers and polyethylene fiber are listed in Table 3.

TABLE 3

Material properties of steel fiber and PE fiber

| Fiber | Bare steel fiber ("B") | Copper-coated steel fiber ("C") | Polyethylene fiber ("PE") |
| --- | --- | --- | --- |
| Material | Steel | | Polyethylene |
| Diameter (mm) | 0.4 | 0.16 | 0.025 |
| Length (mm) | 25 | 13 | 24 |

TABLE 3-continued

Material properties of steel fiber and PE fiber

| Fiber | Bare steel fiber ("B") | Copper-coated steel fiber ("C") | Polyethylene fiber ("PE") |
|---|---|---|---|
| Length-to-diameter ratio | 62.5 | 81.3 | 960 |
| Tensile strength (MPa) | 1200 | 2000 | 3200 |
| Elastic modulus (GPa) | 200 | 200 | 126 |
| Surface treatment | Bare | Copper-coated | — |
| Hooks in ends | With hooks | Without hooks | |

Figure 2:
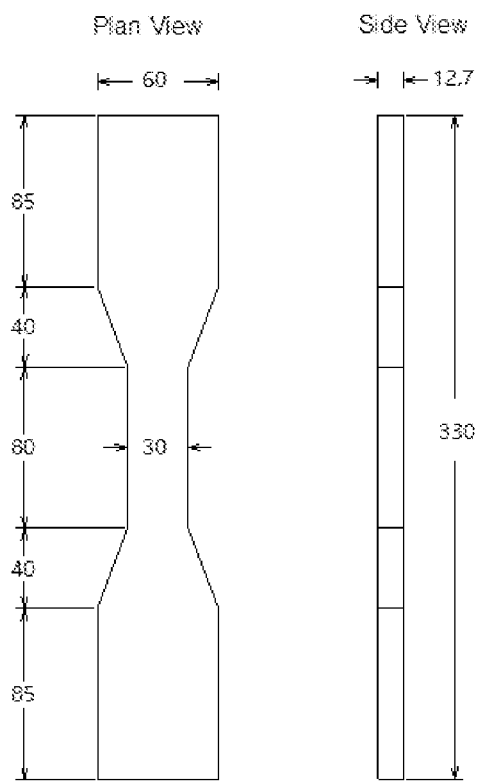
FIG. 2 depicts dimensions of test specimens.

The amount of steel fibers B and C were set at 1%, 2% and 3% by volume of mortar while that of PE fiber is set at 1% by volume of mortar. Fly ash, silica fume, limestone powder, water and superplasticizer were placed in a mixer and mixed for 30 seconds at low speed. The fibers were then added with mixer running for 30 seconds. Lastly river sand was added and the mortar was mixed until uniform. Mortar without fiber was also prepared as reference. In each formulation, cubic specimens with dimension of 70×70×70 mm and dog-bone type specimens were prepared for compressive strength test and direct tensile test respectively. The dog-bone specimens had length of 330 mm with expanded ends, as shown in FIG. 2.

Figure 3:
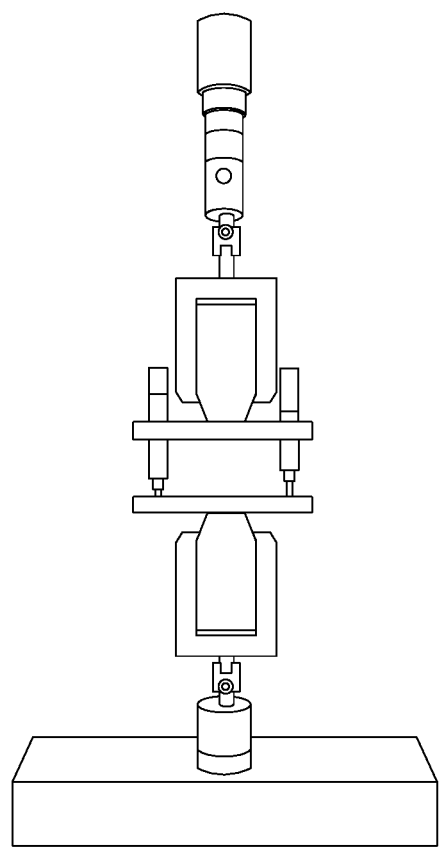
FIG. 3 depicts testing of a repair mortar test specimen.

The specimens were removed from molds one day after casting. The cubic specimens were used to test one-day compressive strength. The loading rate of the compression test was 0.6 MPa/s. The test was terminated when the compressive load reduced to 85% of its maximum. The dog-bone specimens were cured in air for 28 days and then subjected to a direct tensile test. Axial load was applied by a Mechanical Testing and Simulation ("MTS") system through the fixtures attached to the two ends of the specimen. The ends of fixtures were connected to ball joints to avoid eccentric loading. The loading rate of the tensile test was 1 mm/min. The axial deformation of the specimen was measured between one pair of aluminum sheets with a gauge length of 80 mm. Relative displacement between the sheets was recorded by a pair of LVDTs connected to the sheets, as shown in FIG. 3.

The one-day compressive strength of repair mortar incorporating different contents of fibers is listed in Table 4. The compressive strength is maintained at approximately 25 MPa even when the content of steel fiber B was varied from 1% to 3%. When the steel fiber C was increased from 1% to 3%, the compressive strength increased to 27.2 MPa at 2% and then decreased to 24 MPa at 3%, probably due to the high fiber content which lowered the workability of the repair mortar. As compared to steel fiber B, steel fiber C has a larger length-to-diameter ratio, which contributes to the effect of fibers in restraining repair mortar cracks under compression and results in higher compressive strength. Comparatively, polyethylene fiber slightly lowered the one-day compressive strength, however, it achieved the required strength of 15 MPa.

TABLE 4

One-day compressive strength of fiber reinforced mortar (MPa)

| | Formula | | | | | | | |
|---|---|---|---|---|---|---|---|---|
| | Basic Mortar | B1 | B2 | B3 | C1 | C2 | C3 | PE1 |
| | | Fiber dosage (by volume of mortar) | | | | | | |
| | — | 1% | 2% | 3% | 1% | 2% | 3% | 1% |
| 1-day compressive strength | 25.0 | 25.4 | 25.4 | 25.2 | 26.8 | 27.8 | 23.0 | 18.8 |
| | 25.2 | 24.1 | 25.4 | 24.3 | 26.4 | 26.7 | 23.2 | 21.5 |
| | 24.4 | 26.2 | 25.5 | 25.1 | 26.7 | 27.2 | 25.7 | 20.1 |
| Average | 24.9 | 25.2 | 25.4 | 24.9 | 26.6 | 27.2 | 24.0 | 20.1 |

Figure 4A:
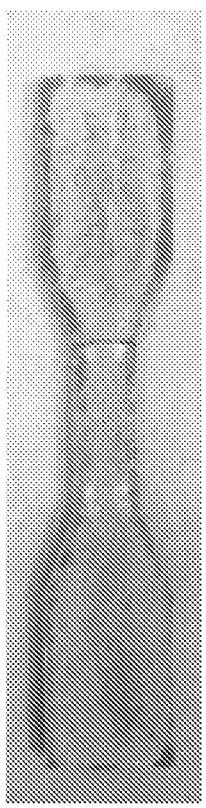
FIGS. 4A-4H depict the results of mechanical testing of repair mortar specimens.
Figure 4B:
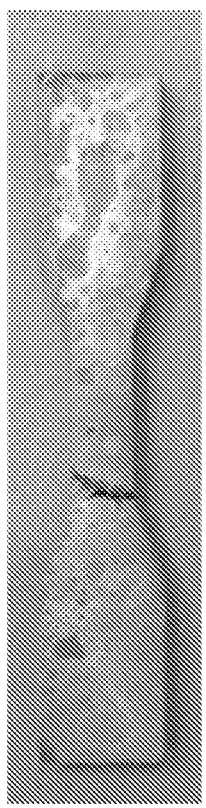
Figure 4C:
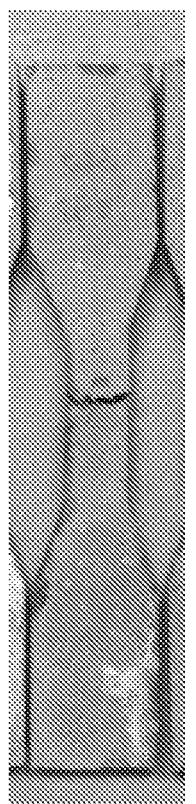
Figure 4D:
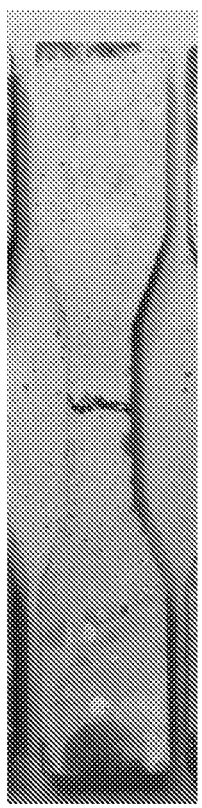
Figure 4E:
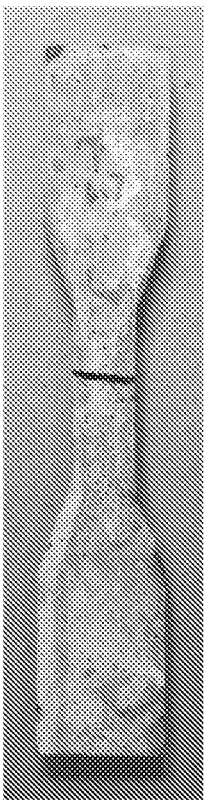
Figure 4F:
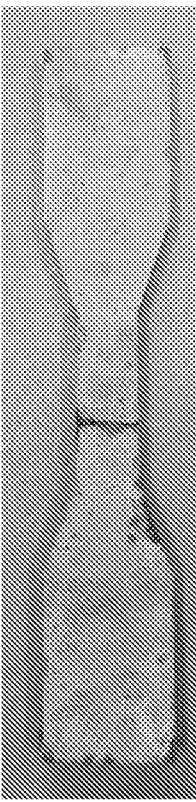
Figure 4G:
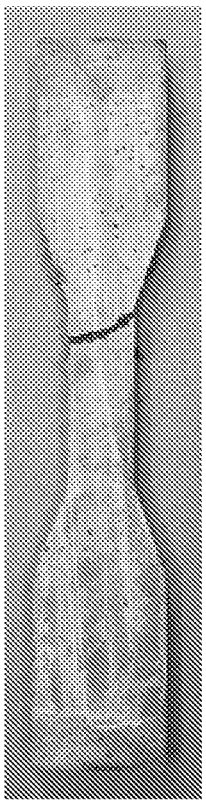
Figure 4H:
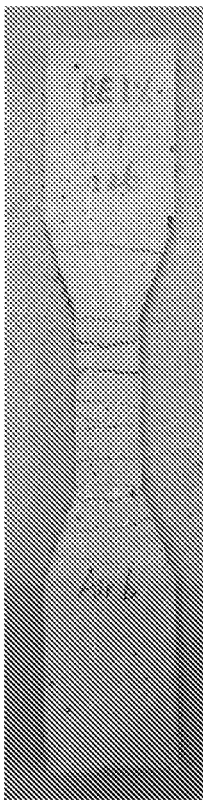

FIGS. 4A-4H show the failure mode of fiber reinforced repair mortars subjected to direct tension. The control specimens (repair mortar without fiber) fractured suddenly after reaching its maximum tensile strength. The tensile behavior of the specimens containing either steel fiber B or C was different, in which one single crack formed on the specimen. The crack propagated until a through crack formed. When the specimen was further loaded, the steel fibers started to take up part of the tensile force. The tensile stress of the specimens decreased gradually with increasing tensile strain. Moreover, the specimens containing PE fiber behaved differently that the strain-hardening behavior was exhibited, i.e. the specimen can retain a certain amount of tensile force when increasing the tensile strain. When a crack formed, the tensile force was redistributed to the uncracked part. The tensile stress can be increased back to the proceeding peak value when the tensile strain was increased. There were a number of fine cracks on the specimens containing polyethylene fibers, as shown in FIG. 4H. Instead, the existing cracks widened followed by polyethylene fibers pulling out from the repair mortar. Both steel fiber and polyethylene fiber reinforced repair mortars failed due to pull-out of fibers from the repair mortar.

Figure 5A:
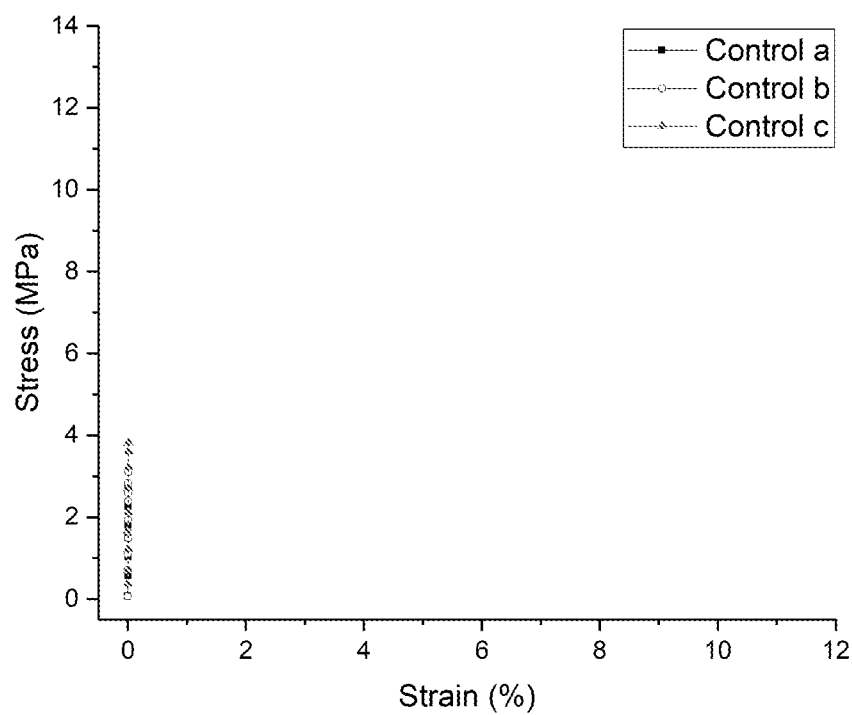
FIGS. 5A-5D are stress-strain curves for repair mortar specimens under direct tension (each specimen is tested in triplicate)
Figure 5B:
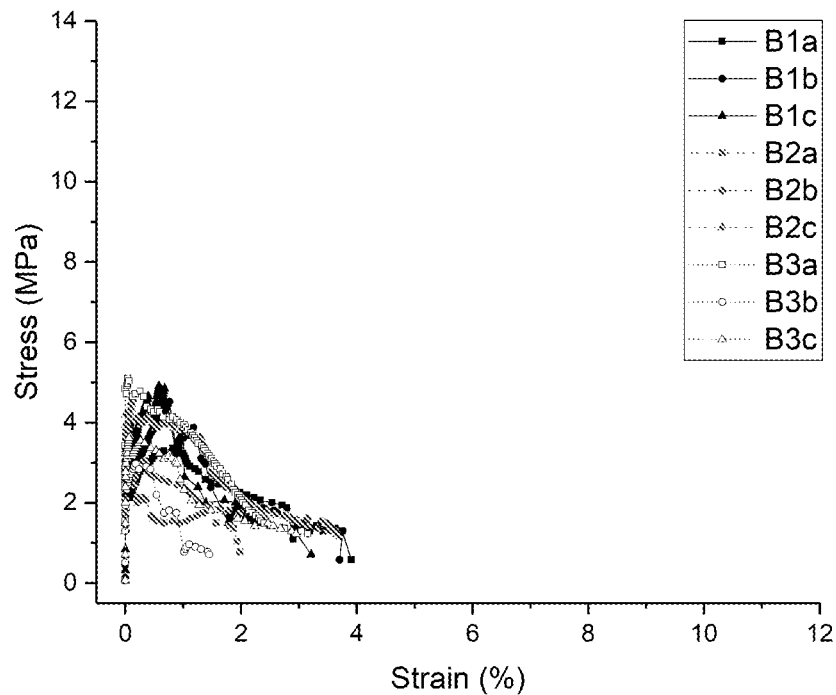
Figure 5C:
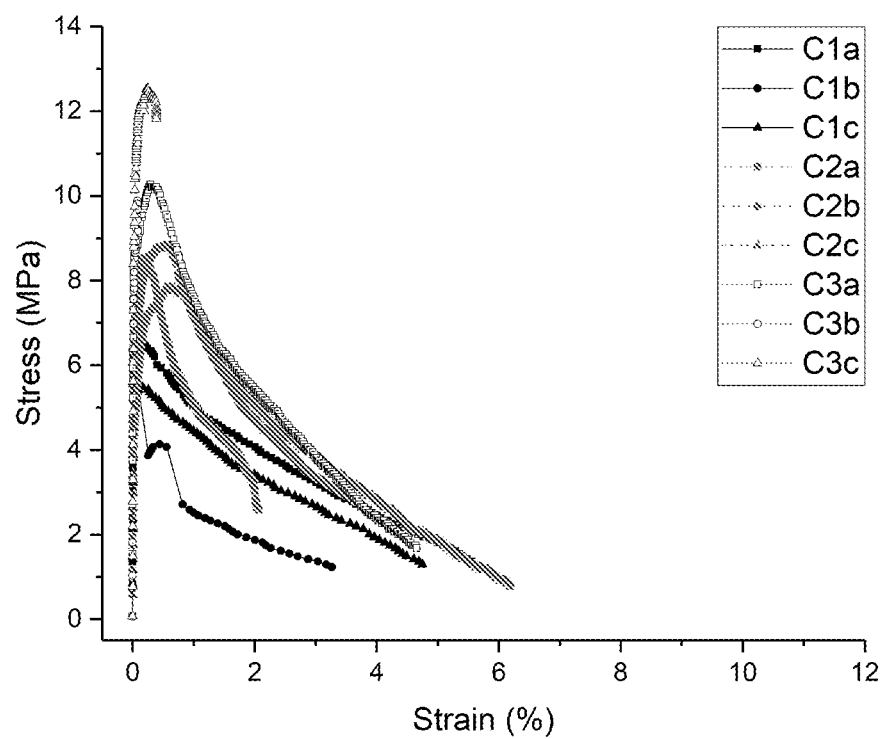
Figure 5D:
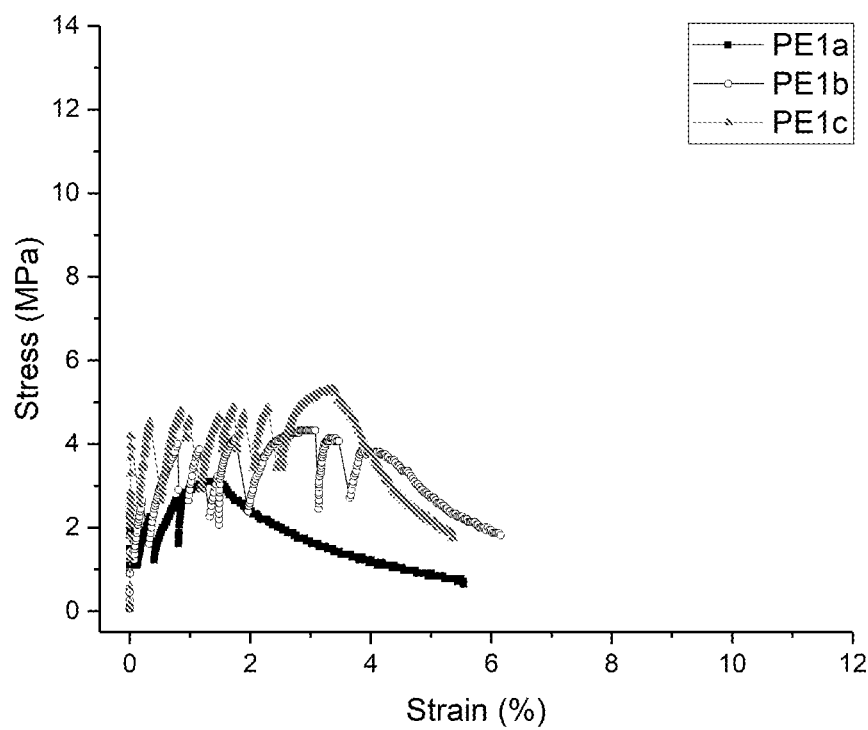

Axial stress-strain relationships of specimens under tension are depicted in FIGS. 5A-5D. The repair mortar without fibers had an ultimate tensile strain of 0.009%. After being reinforced by steel fibers B and C, the specimens achieved a slight enhancement in the ultimate strain, but significant improvement in tensile strength. FIG. 5B shows that steel fiber B can increase the tensile strength of mortar from 3.2 MPa to 4.3 MPa. Steel fiber C provided a higher tensile strength to the repair mortar than fiber B. The tensile strength can be increased to 10.9 MPa using 3% of steel fiber C by volume of repair mortar, as shown in FIG. 5C.

The stress-strain curve of polyethylene fiber reinforced repair mortar consisted of two stages, pre-crack stage and post-crack stage. The first stage was generally linear. Compared to control specimens, polyethylene fiber reinforced mortar maintains similar tensile stress when the first crack occurred. The tensile stress dropped and the tensile force was redistributed. The tensile stress can be increased back to the proceeding peak value when the displacement was increased. Both tensile strength and ultimate strain of the repair mortar were effectively improved by polyethylene fibers.

Tensile strength and ultimate strain of fibers reinforced repair mortar are given in Table 5. Compared to control specimens, specimens reinforced by 1% of steel fibers B had an improvement of 34% in tensile strength. However, as fiber loading increased, tensile strength descended gradually. It is probably due to hooks at ends of steel fibers B which lead to conglobation of fibers. As a result, higher fiber contents caused uneven distribution and thus lower tensile strength. On the other hand, the tensile strength of specimens containing steel fibers C increased with increasing dosage of fibers. Fiber dosage ranging from 1% to 3% resulted in enhancement from two to three times in tensile strength of mortar. Relatively small diameter of steel fibers C increases interfacial area between fibers and the repair mortar, which lead to a greater improvement in tensile performance. Addition of steel fibers in mortar improved the ultimate strain of the repair mortar up to 0.7%. The best tensile strain performance was observed in the specimens containing polyethylene fibers. With incorporation of 1% polyethylene fibers, the specimens can achieve an ultimate tensile strain of 2.7%.

TABLE 5

Tensile strength and ultimate strain of fiber reinforced mortar

| Material | Specimen | Tensile strength (MPa) | Average (MPa) | Ultimate strain (%) | Average (%) |
| --- | --- | --- | --- | --- | --- |
| Control | Control a | 2.7 | 3.2 | 0.007 | 0.009 |
|  | Control b | 3.1 |  | 0.010 |  |
|  | Control c | 3.8 |  | 0.011 |  |
| Mortar reinforced by 1% of steel fiber B | B1a | 3.4 | 4.3 | 0.822 | 0.722 |
|  | B1b | 4.5 |  | 0.762 |  |
|  | B1c | 4.9 |  | 0.583 |  |
| Mortar reinforced by 2% of steel fiber B | B2a | 3.7 | 4.0 | 0.014 | 0.050 |
|  | B2b | 3.6 |  | 0.010 |  |
|  | B2c | 4.6 |  | 0.126 |  |
| Mortar reinforced by 3% of steel fiber B | B3a | 5.1 | 3.9 | 0.049 | 0.100 |
|  | B3b | 3.0 |  | 0.185 |  |
|  | B3c | 3.6 |  | 0.066 |  |
| Mortar reinforced by 1% of steel fiber C | C1a | 7.0 | 6.3 | 0.016 | 0.015 |
|  | C1b | 6.3 |  | 0.014 |  |
|  | C1c | 5.6 |  | 0.016 |  |
| Mortar reinforced by 2% of steel fiber C | C2a | 8.5 | 8.4 | 0.154 | 0.468 |
|  | C2b | 8.8 |  | 0.562 |  |
|  | C2c | 7.8 |  | 0.686 |  |
| Mortar reinforced by 3% of steel fiber C | C3a | 10.3 | 10.9 | 0.300 | 0.207 |
|  | C3b | 9.9 |  | 0.081 |  |
|  | C3c | 12.5 |  | 0.241 |  |
| Mortar reinforced by 1% of PE fiber | PE1a | 3.1 | 4.2 | 1.493 | 2.656 |
|  | PE1b | 4.3 |  | 3.079 |  |
|  | PE1c | 5.3 |  | 3.398 |  |

As seen above, steel fibers C performed better than steel fibers B in improving compressive strength and tensile strength of mortar. Polyethylene fibers achieved significant improvement in tensile strength and ultimate strain of the repair mortar. Both steel fibers C and polyethylene fibers were added into repair mortar to realize the advantages of both fibers. Loading of the two-fiber system was optimized for compressive and tensile performance and cost of the repair mortar. One-day compressive strength, tensile strength and ultimate strain of two-fiber reinforced repair mortar were tested.

Three different formulas with varying fiber loadings were tested, as set forth in Table 6, below. Cement, fly ash, silica fume, limestone powder, water and half of superplasticizer were placed in a mixer and mixed for 30 seconds at a relatively low speed. Polyethylene fibers were then added with mixer running for 30 seconds at high speed. Subsequently river sand, steel fibers and the balance of the superplasticizer were added and the mortar was mixed until uniform. In each formulation, three cubic specimens and three dog-bone type specimens were prepared for compression tests and direct tensile tests, respectively. The specimens were removed from molds 24 hours after casting. The cubic specimens were used to test one-day compressive strength. The dog-bone specimens were under air-curing for 28 days and then subjected to direct tensile test.

TABLE 6

Fiber dosages of hybrid fibers reinforced mortar (by volume of mortar)

| Formula | PE1SF1 | PE1SF0.5 | PE0.8SF0.3 |
| --- | --- | --- | --- |
| PE fiber | 1% | 1% | 0.8% |
| Steel fiber C | 1% | 0.5% | 0.3% |

The one-day compressive strength of fiber reinforced mortar is tabulated below. Mortar formulation PE1SF1 gave 23.9 MPa. Compared to PE1SF1, PE1SF0.5 had a slight reduction of 0.7 MPa in one-day compressive strength due to decreasing dosage of steel fiber. As dosage of both steel fibers and PE fibers reduced by 0.2%, the one-day compressive strength reduced to 22.4 MPa.

TABLE 7

One-day compressive strength of hybrid fibers reinforced mortar (MPa)

| Mortar Formulation | PE1SF1 | PE1SF0.5 | PE0.8SF0.3 |
| --- | --- | --- | --- |
| 1-day compressive strength | 22.6 | 23.4 | 21.8 |
|  | 24.3 | 23.4 | 24.4 |
|  | 24.7 | 22.8 | 23.0 |
| Average | 23.9 | 23.2 | 22.4 |

Figure 6A:
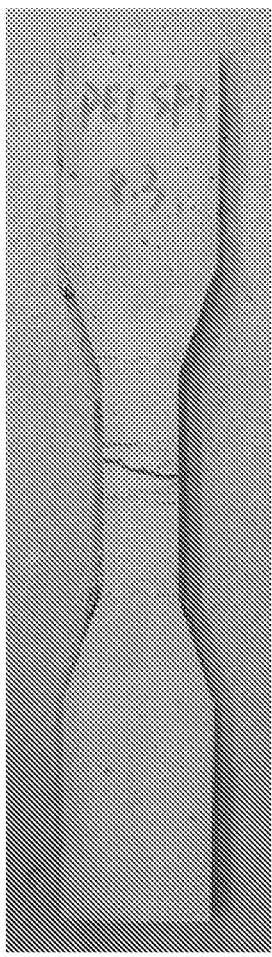
FIGS. 6A-6C depict failure modes of hybrid fiber reinforced mortar under direct tension (each formulation is tested in triplicate)
Figure 6B:
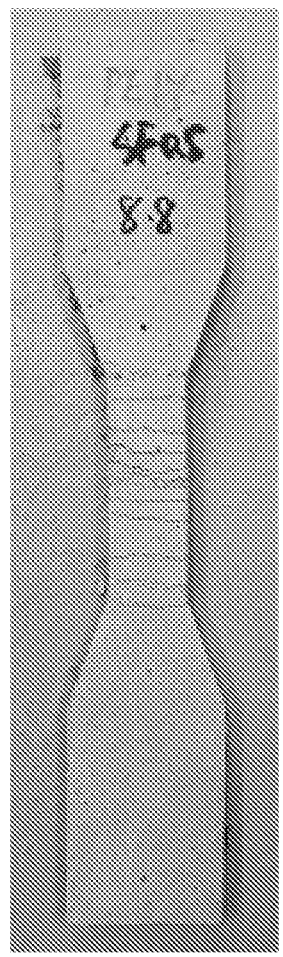
Figure 6C:
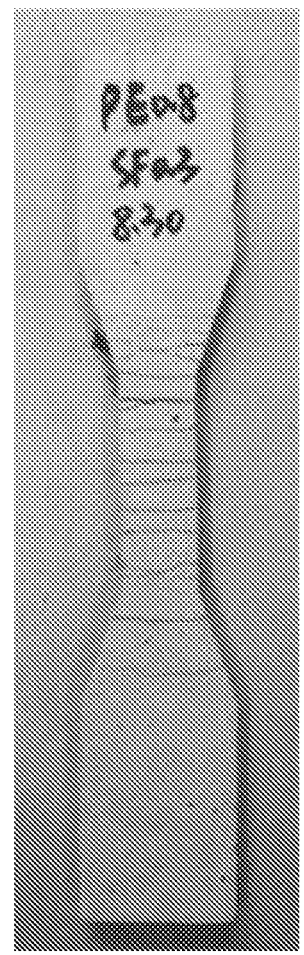

Failure modes of the two-fiber reinforced mortar under direct tension are shown in FIGS. 6A-6C. As the loading of the polyethylene fibers and steel fibers decreased, the number of transverse cracks increased and the intervals between cracks decreased. All the specimens failed due to pull-out of either the polyethylene fibers or steel fibers from the mortar.

Figure 7A:
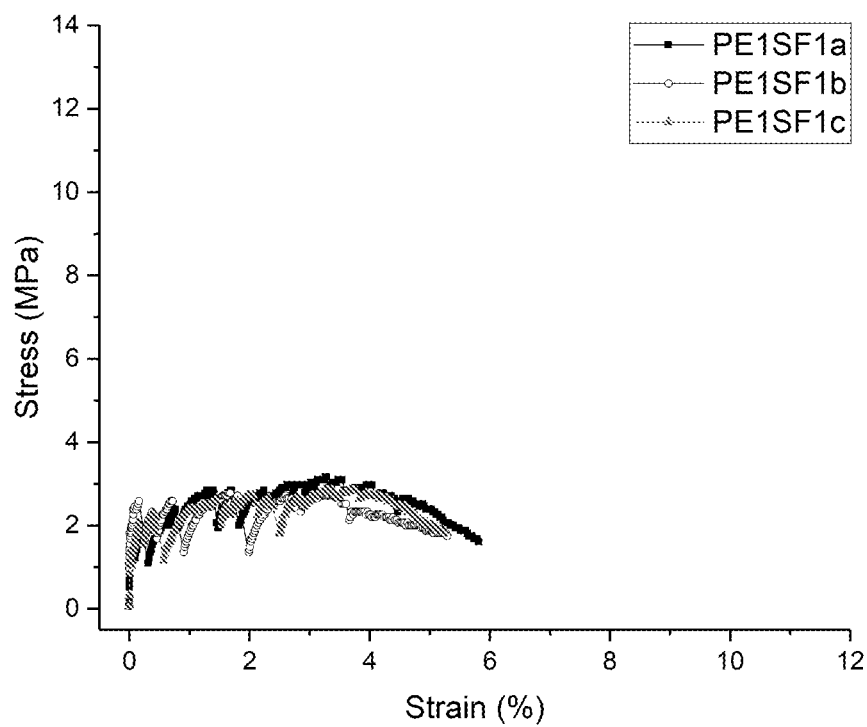
FIGS. 7A-7C show the stress-strain relationships of hybrid fibers reinforced mortars under direct tension (each formulation is tested in triplicate)
Figure 7B:
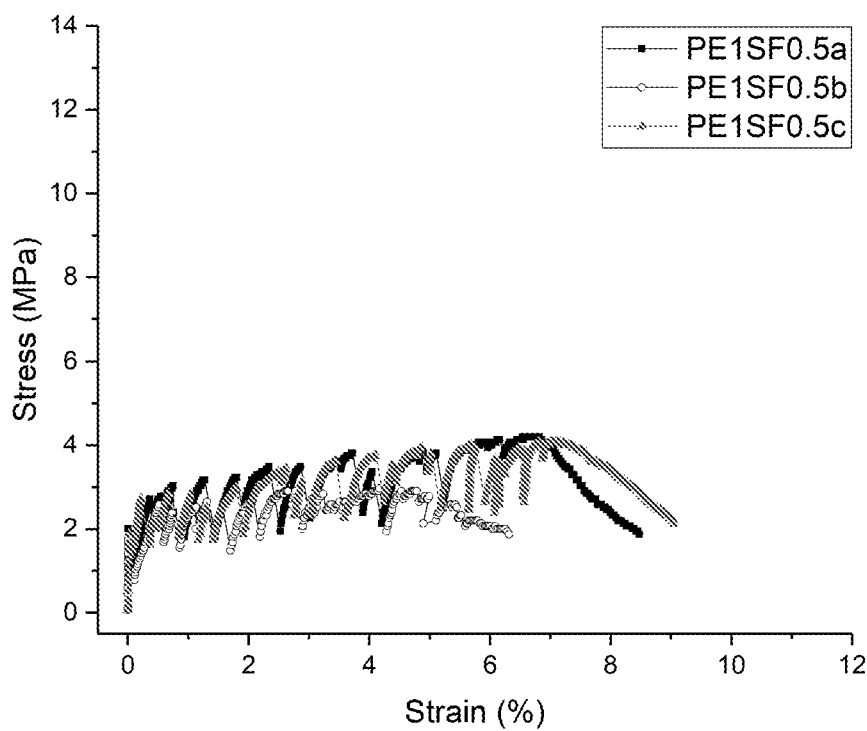
Figure 7C:
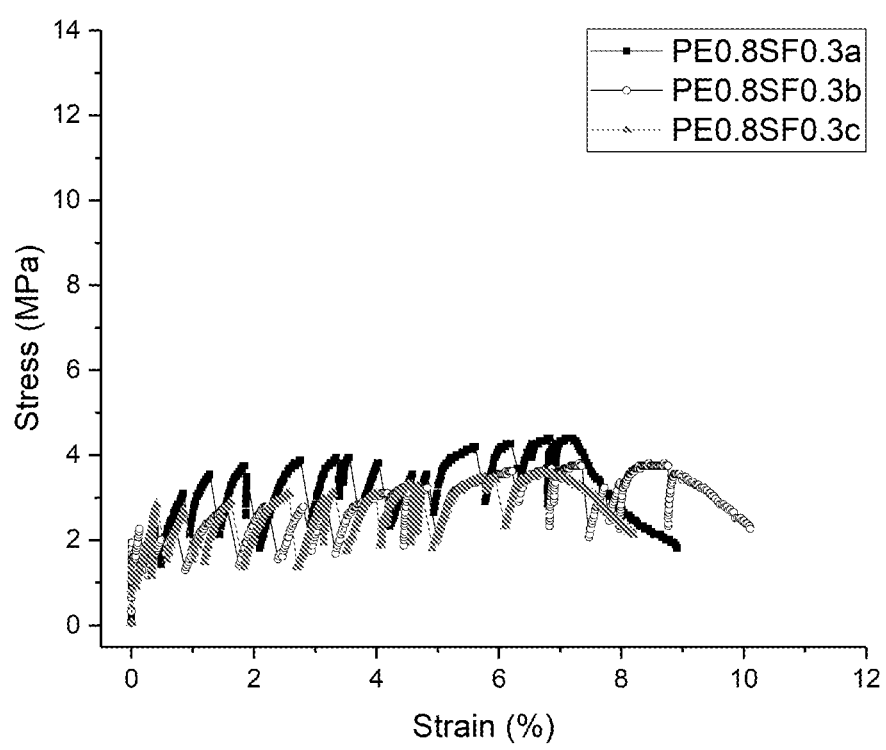

The axial stress-strain relationships of hybrid fibers reinforced mortar are given in FIGS. 7A-7C. All the specimens displayed strain-hardening behavior. Compared to specimens PE1, addition of steel fibers can alleviate fluctuation of tensile stress when mortar cracked. Tensile strength and ultimate strain of specimens were increased with decreasing dosage of hybrid fibers. It is likely due to the interaction between steel fibers and cementitious matrix. Less fiber loading may can achieve better distribution in mortar.

Tensile strength and ultimate strain of two-fiber reinforced repair mortar are listed in Table 8. From the ultimate strain results, lowering the steel content can increase both the ultimate strain and tensile strength. The formulation PE0.8SF0.3 exhibited the best performance.

TABLE 8

Tensile strength and ultimate strain of hybrid fibers reinforced mortar

| Formulation | Specimen | Tensile strength (MPa) | Average (MPa) | Ultimate strain (%) | Average (%) |
| --- | --- | --- | --- | --- | --- |
| PE1SF1 | PE1SF1a | 3.2 | 2.9 | 3.289 | 2.916 |
|  | PE1SF1b | 2.8 |  | 1.680 |  |
|  | PE1SF1c | 2.8 |  | 3.780 |  |
| PE1SF0.5 | PE1SF0.5a | 4.2 | 3.7 | 6.823 | 6.067 |
|  | PE1SF0.5b | 3.0 |  | 4.167 |  |
|  | PE1SF0.5c | 4.1 |  | 7.212 |  |

TABLE 8-continued

Tensile strength and ultimate strain of hybrid fibers reinforced mortar

| Formulation | Specimen | Tensile strength (MPa) | Average (MPa) | Ultimate strain (%) | Average (%) |
|---|---|---|---|---|---|
| PE0.8SF0.3 | PE0.8SF0.3a | 4.4 | 3.9 | 7.211 | 7.607 |
|  | PE0.8SF0.3b | 3.8 |  | 8.704 |  |
|  | PE0.8SF0.3c | 3.6 |  | 6.908 |  |

Incorporation of polymers in the repair mortar is desirable as it can enhance the tensile strength and bond strength between repair mortar and concrete substrate. Two types of polymers, including styrene butadiene rubber (SBR) and ethylene vinyl acetate (EVA), were used to enhance the tensile bond strength of the repair mortar. Five dosages for each polymer including 0, 2%, 4%, 6% and 8% by mass of binder were mixed into mortar without fiber (Table 9). Tensile strength, bond strength, one-day compressive strength of the polymer-modified mortar were tested.

TABLE 9

Dosage of polymer used for repair mortar (by mass of binder)

| Formula | Control | EVA2 | EVA4 | EVA6 | EVA8 | SBR2 | SBR4 | SBR6 | SBR8 |
|---|---|---|---|---|---|---|---|---|---|
| Polymer | — | | | EVA | | | | SBR | |
| Dosage | — | 2% | 4% | 6% | 8% | 2% | 4% | 6% | 8% |

Figure 8:
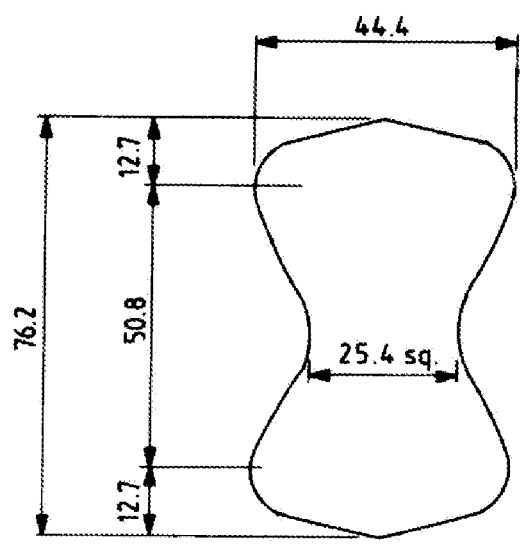
FIG. 8 depicts the dimensions of dumb-bell-shaped specimens for tensile and bond tests.
Figure 9:
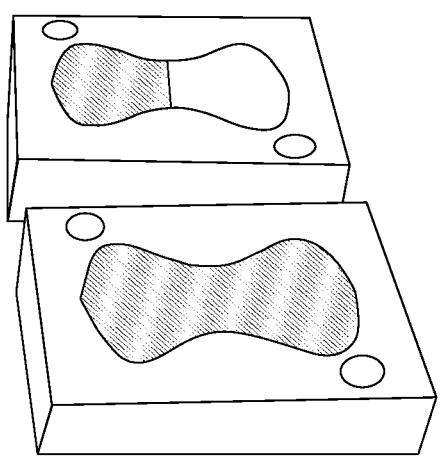
FIG. 9 shows the distribution of pre-cast and fresh mortar for bond tests.
Figure 10:
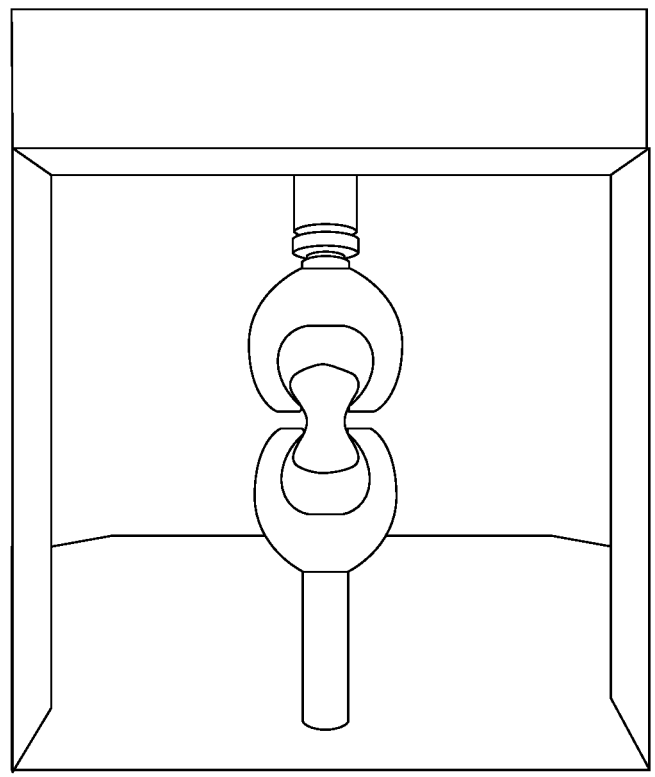
FIG. 10 shows an MTS apparatus for tensile test of repair mortar specimens.
Figure 11:
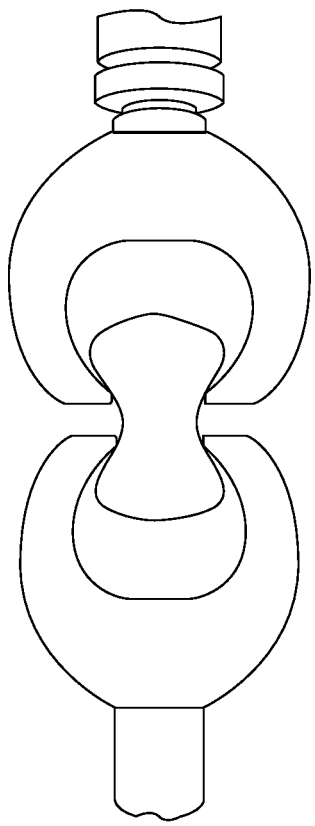
FIG. 11 shows an MTS apparatus for bond test of repair mortar specimens.

The procedure for preparing polymer-modified repair mortar was similar to that used above. When fresh control mortar was ready, polymer was added into the mortar. The mortar was mixed for an additional 30 seconds at high speed. In each formulation, three cubic specimens were prepared for the compression test. The method of the compression test was the same as that set forth above. Six dumb-bell shaped specimens were prepared and cured in water for 7 days, and then subjected to the tensile test and bond test, respectively. FIG. 8 shows the dimensions of the dumb-bell shaped specimen. For the specimens used for the bond test, a half precast mortar specimen with a groove was placed into a mold. Fresh mortar was then cast into the remaining portion of the mold (FIG. 9). The tensile test and bond test of mortar specimens were conducted in an MTS system (FIGS. 10 and 11). The loading rate was 1 mm/min for both the tensile test and bond test.

The one-day compressive strength of the polymer-modified mortar is given in Table 10. Both EVA and SBR can weaken the one-day compressive strength of the polymer-modified repair mortar. As the percentage of EVA and SBR increased, the polymer-modified mortar experienced gradual deterioration in compressive strength. When dosage of polymer increased to 8% by mass of binder, the compressive strength of mortar was very close to the required compressive strength of 15 MPa.

TABLE 10

One-day compressive strength of polymer-modified mortar (MPa)

| Formula | Control | EVA2 | EVA4 | EVA6 | EVA8 | SBR2 | SBR4 | SBR6 | SBR8 |
|---|---|---|---|---|---|---|---|---|---|
| 1-day compressive strength | 25.0 | 20.5 | 17.1 | 15.5 | 15.5 | 17.2 | 16.5 | 15.4 | 15.7 |
|  | 25.2 | 20.6 | 16.6 | 16.2 | 14.7 | 17.2 | 17.4 | 15.0 | 15.1 |
|  | 24.4 | 21.6 | 16.5 | 15.5 | 15.8 | 17.5 | 16.4 | 15.3 | 14.3 |
| Average | 24.9 | 20.9 | 16.7 | 15.7 | 15.3 | 17.3 | 16.8 | 15.2 | 15.1 |

Failure modes of the polymer-modified mortar in tensile tests and bond tests are shown in FIGS. 12A and 12B. FIG. 12A shows that the specimens fractured in the middle under direct tensile load. Interfacial failure occurred in specimens in bond test, as shown in FIG. 12B. Tensile strength and bond strength can be determined by tensile load divided by area of fracture surface. The values are listed in Table 11. Both EVA and SBR displayed significant improvement in tensile strength of mortar. However, EVA had little effect on the bond strength of mortar, while SBR improved bond strength. Therefore, SBR was adopted for further study. The dosage of SBR was set to 2%.

TABLE 11

Tensile strength and bond strength of polymer-modified mortar (MPa)

| Formula | Control | EVA2 | EVA4 | EVA6 | EVA8 | SBR2 | SBR4 | SBR6 | SBR8 |
|---|---|---|---|---|---|---|---|---|---|
| Tensile strength | 1.64 | 2.60 | 2.41 | 2.19 | 2.98 | 2.26 | 2.90 | 3.62 | 2.22 |
|  | 1.94 | 2.36 | 2.39 | 1.93 | 2.49 | 2.17 | 2.83 | 3.40 | 3.27 |
|  | 1.73 | 2.13 | 2.06 | 2.56 | 2.63 | 2.23 | 2.41 | 2.48 | 2.68 |
| Average | 1.77 | 2.36 | 2.29 | 2.23 | 2.70 | 2.22 | 2.72 | 3.17 | 2.72 |
| Bond strength | 1.30 | 1.34 | 0.96 | 0.83 | 1.00 | 1.02 | 0.97 | 1.34 | 1.15 |
|  | 1.81 | 1.02 | 0.89 | 0.88 | 1.27 | 1.66 | 1.55 | 2.02 | 2.01 |
|  | 1.08 | 1.68 | 0.87 | 1.11 | 1.11 | 1.51 | 1.97 | 1.24 | 1.89 |
| Average | 1.40 | 1.35 | 0.91 | 0.99 | 1.13 | 1.39 | 1.50 | 1.53 | 1.68 |

The optimized PHMRM is a cement-based mortar with water-to-binder ratio of 0.35. The dosage of PE fiber and steel fiber of 0.8% and 0.3% by volume of mortar respectively. The dosage of SBR is set to 2% by mass of binder. Compression test, direct tensile test and bond test were conducted on the optimized mortar to verify the mechanical properties, such as one-day compressive strength, tensile strength and strain, and bond strength. The corresponding specimens, including cubes, dog-bone specimens and dumb-bell specimens, were prepared and tested. For the dumb-bell specimens, a mortar primer was coated on the specimen interface, as shown in FIG. 13. The optimal repair mortar achieved one-day compressive strength of 17.7 MPa, a tensile strength of 3.9 MPa, an ultimate strain of 9.85%, and bond strength of 2.31 MPa.

Chamfer

As discussed above, the repair mortars of the present invention may be used to form chamfers at beam column joints to strengthen the beam-column joints. Adding chamfers to beam-column joints enhances the load-carrying capacity, improves energy dissipation, and suppresses brittle joint shear failure (which is an undesirable failure mode for building and particularly during seismic events). Typically, smaller chamfer sizes (desirable from a "usable floor space" point of view) receive larger compressive and tensile stresses, requiring better chamfer material to distribute the stresses, as with the material of the present invention. The dimension of chamfers is dependent on column width/beam depth, reinforcement configuration, mechanical properties (strength and elastic modulus) of concrete and chamfers. Two important parameters are the column width/beam depth and properties of the chamfer material.

Figure 43:
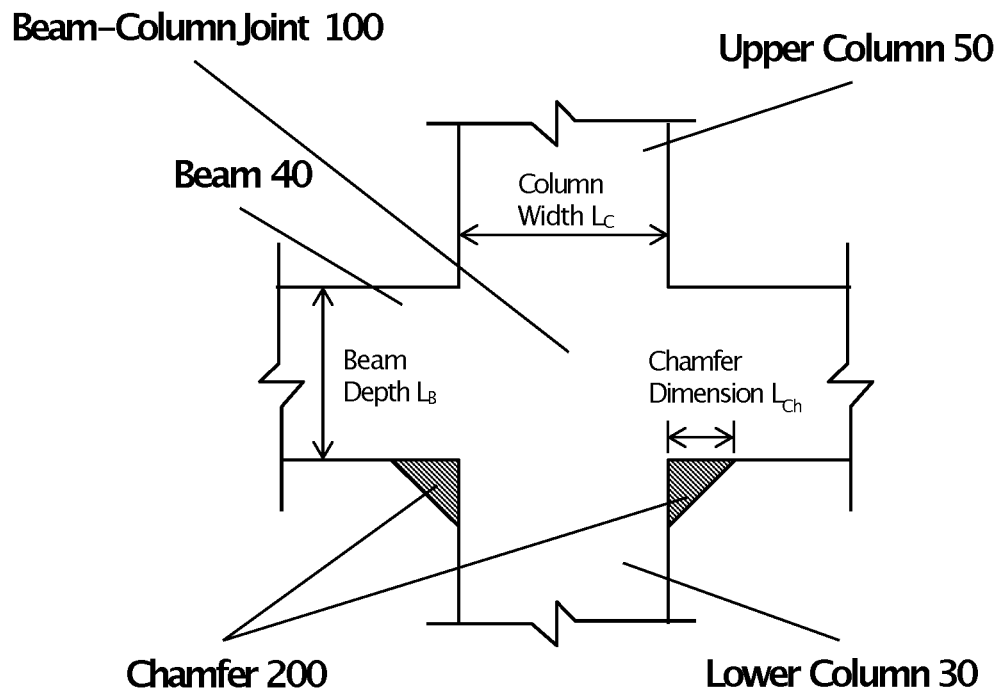
FIG. 43 schematically depicts beam depth "$L_B$", column width "$L_C$" and chamfer dimension "$L_{Ch}$"
Figure 44:
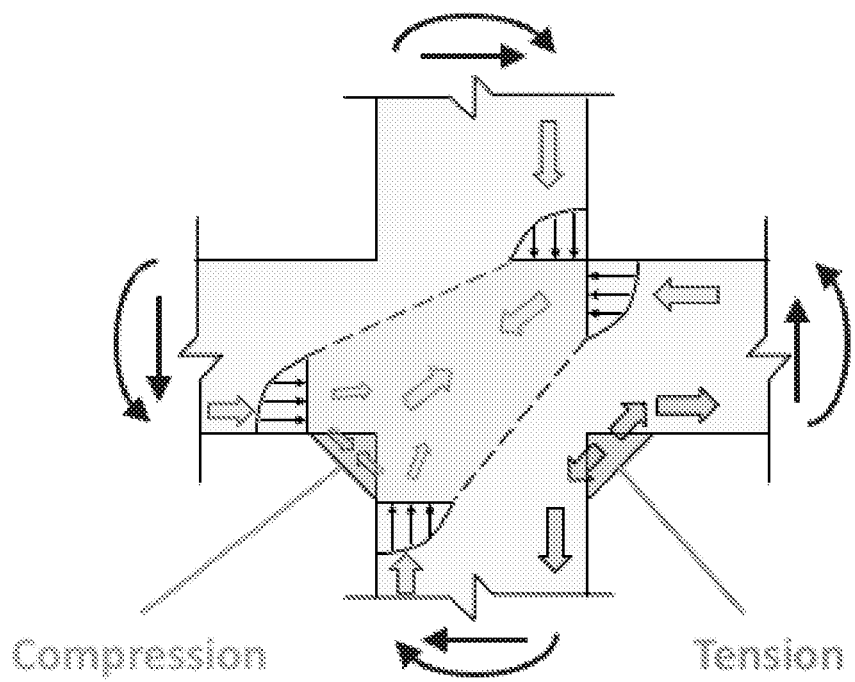
FIG. 44 shows the tensile and compressive stresses of beam-column joints under lateral load.

FIG. 43 depicts a beam-column joint 100 formed where column 50 meets beam 40. A chamfer 200 is positioned on the beam-column joint, the chamfer filling the approximately right-angled intersection between the beam 40 and the column 50, creating an approximately diagonal surface extending between the beam and the lower column 30. As seen in FIG. 44, the chamfer 100 helps distribute the compressive and tensile stresses within the beam-column joint, transferring tensile and compressive loads between the column and the beam. The dimension of chamfers ("$L_{Ch}$") is determined in relation to the least dimension ("$L_{BC}$") of beam depth ("$L_B$") and column width ("$L_C$"), as shown in FIG. 43. The ratio of $L_{Ch}$ to $L_{BC}$ may range from approximately 0.5 to approximately 1.0. This ratio may vary when chamfers of different angles are selected (that is, the range of 0.5 to 1.0 is for approximately 45-degree chamfers. Other chamfer configurations may be used with different aspect ratios, for example, a chamfer height:depth ratio of 2:1 rather than the 1:1 dimension. In one embodiment, the ratio of $L_{Ch}$ to $L_{BC}$ may be 0.5 or 0.67 in the examples for 1:1 dimension set forth below.

Example 2: Chamfer Testing

Seismic Performance of Interior Beam-Column Joints Strengthened by Chamfers:

A pair of chamfers were installed at the beam soffit of interior beam-column joint specimens, as schematically depicted in FIG. 43. Quasi-static load tests were performed to evaluate the seismic behavior of the specimens with and without chamfers. This example will describe specimens and chamfers for strengthening, followed testing results.

Figure 14:
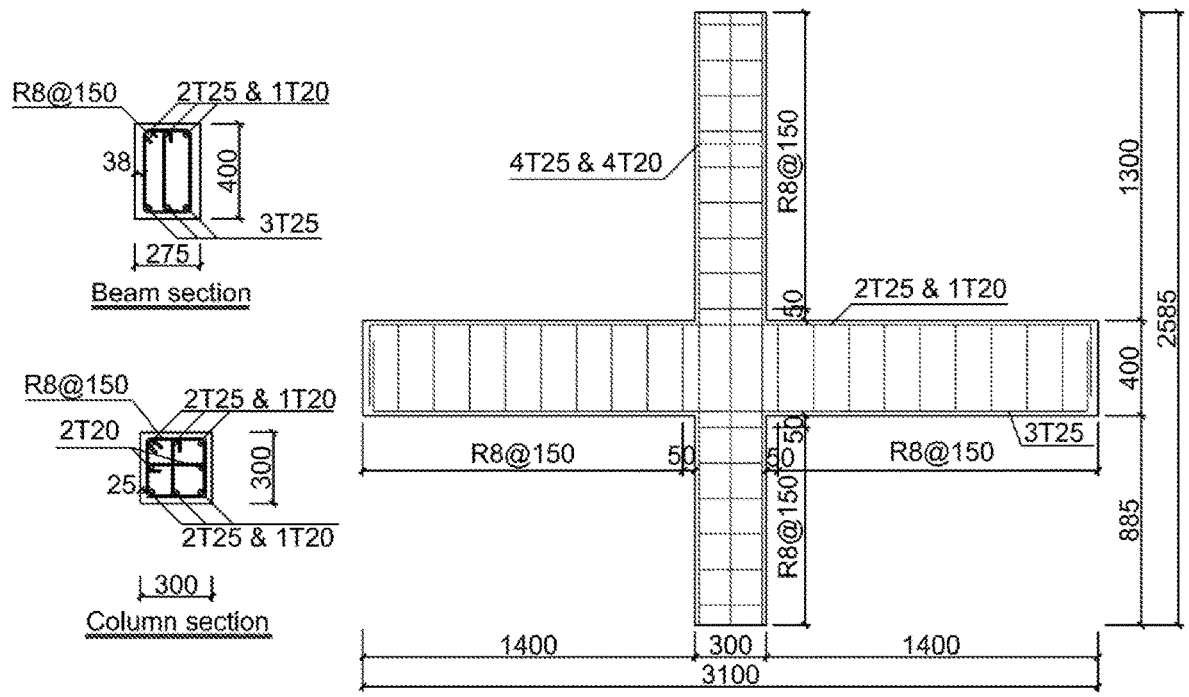
FIG. 14 depicts the dimensions of an interior beam-column joint without transverse reinforcements.
Figure 15:
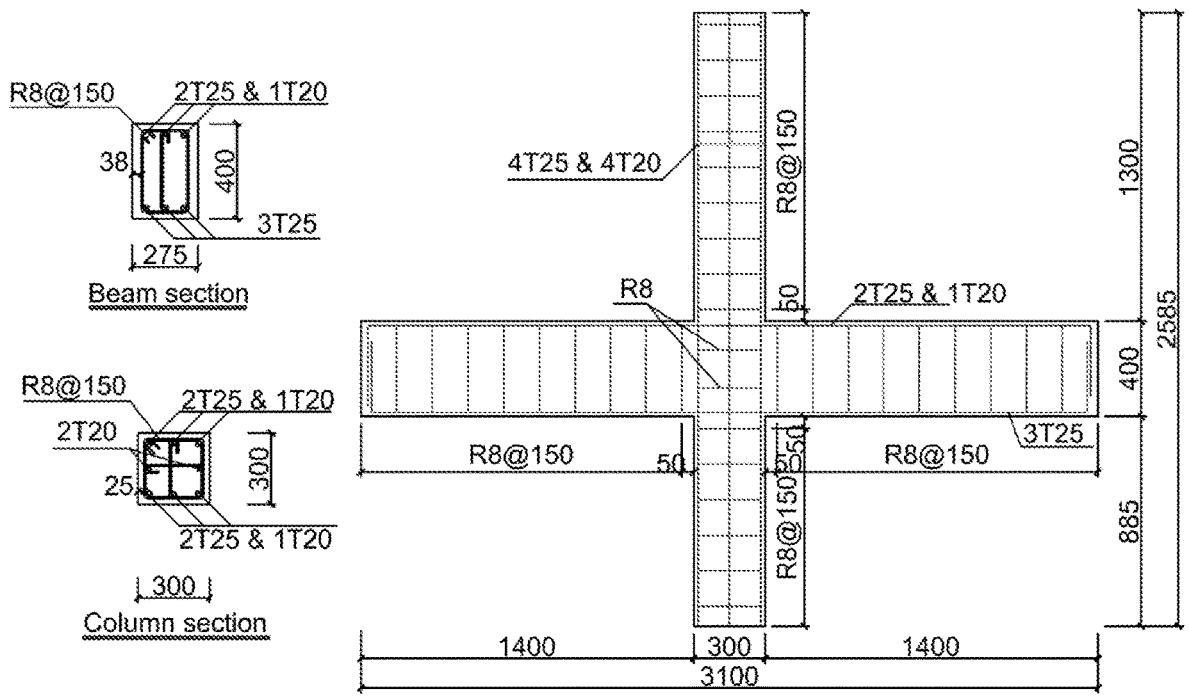
FIG. 15 depicts the dimensions of an interior beam-column joint with transverse reinforcements.
Figure 16:
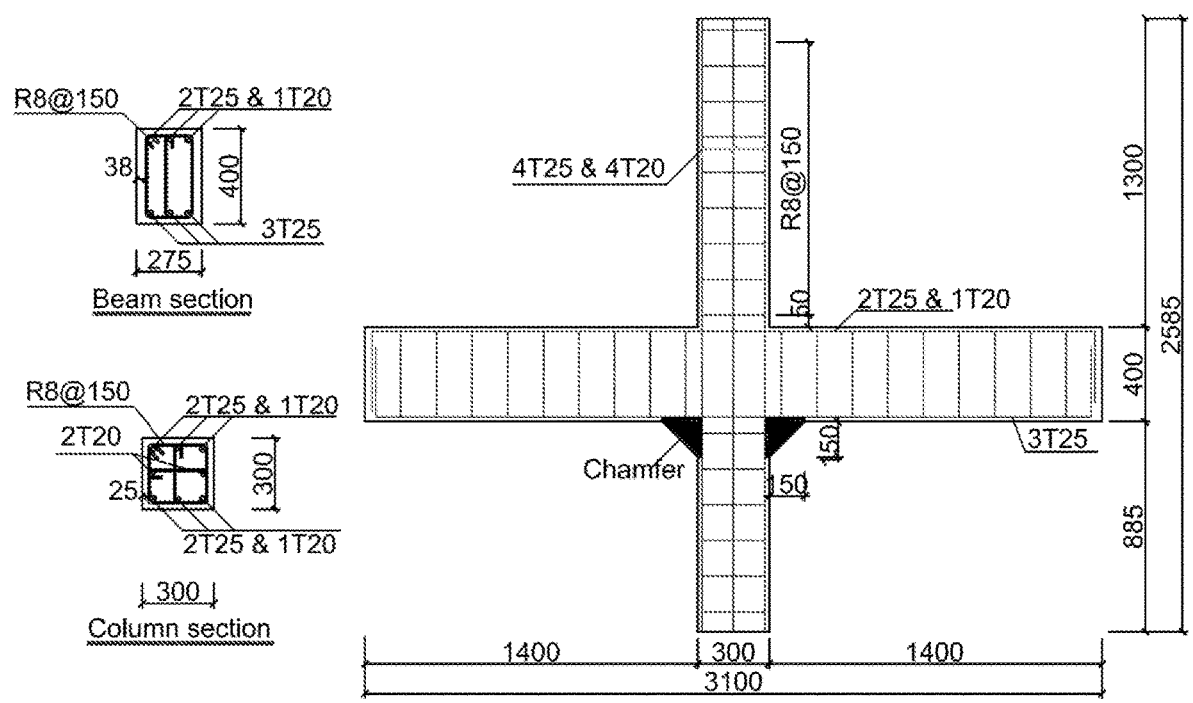
FIG. 16 depicts the dimensions of a beam-column joint and repair chamfers.

Four interior beam-column joint specimens ("IJ-NC", "IJ-SP", "IJ-C150FM" and "IJ-C150FMN") were prepared. The control specimen IJ-NC represents an interior beam-column joint without chamfers. The specimen IJ-SP represents an interior beam-column joint designed according to seismic requirement of Hong Kong Concrete Code 2013. A pair of stirrups with diameter of 8 mm ("R8") was adopted as joint shear reinforcement in specimen IJ-SP. The other specimens IJ-C150FM and IJ-C150FMN represent beam-column joint strengthened by chamfers. The dimension of chamfers is based on the least dimension ("$L_{BC}$") of beam depth and column width, i.e. the column width of 300 mm in this study. Lengths of chamfers ("$L_C$") are taken as one half of $L_{BC}$, i.e. 150 mm for interior beam-column joints (Table 12). Dimension and reinforcement details of specimens are given in FIGS. 14-16. The columns are 2585 mm height with a cross section of 300 mm×300 mm. The beams are 3100 mm long with a cross section of 275 mm×400 mm. Deformed bars with diameters of 20 mm and 25 mm ("T20 and T25") are used as longitudinal reinforcements. Concrete cover is 25 mm to stirrups.

TABLE 12

Details of interior BCJ specimens

| ID of specimen | Shear reinforcements in joint | Chamfers |
| --- | --- | --- |
| IJ-NC | Without | Without |
| IJ-SP | A pair of R8 | Without |
| IJ-C150FM | Without | Chamfers with size of 150 mm were cast using fixed formwork |
| IJ-C150FMN | Without | Chamfers with size of 150 mm were cast using lifting formwork |

The concrete grade for the test specimen was C30 according to the as-built record. Ready-mixed concrete with a slump of 150 mm was used. All specimens are cured in air after demolding. The compressive strength of concrete "$f_{cu}$" of each specimen was measured using 100 mm cubes one day before the quasi-static test, as listed in Table 13.

TABLE 13

Compressive strength of concrete (MPa)

| Specimen | IJ-NC | IJ-SP | IJ-C150FM | IJ-C150FMN |
| --- | --- | --- | --- | --- |
| $f_{cu}$ | 53.2 | 38.7 | 39.5 | 44.8 |

Figure 17A:
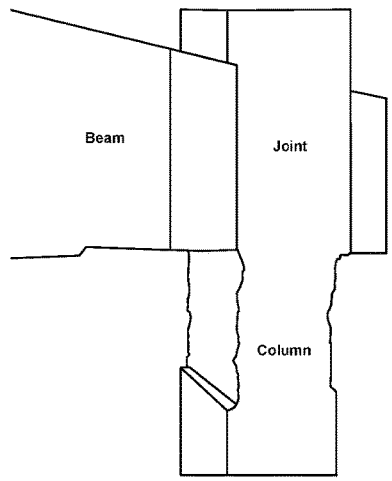
FIGS. 17A-17F depict formation of a chamfer using the repair mortar.
Figure 17B:
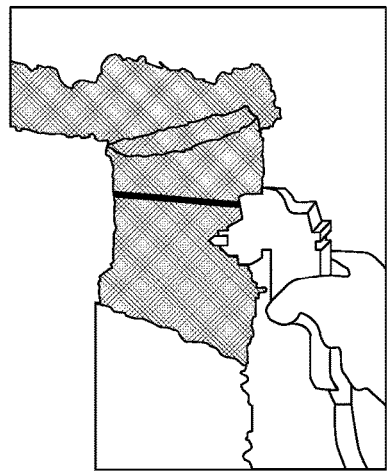
Figure 17C:
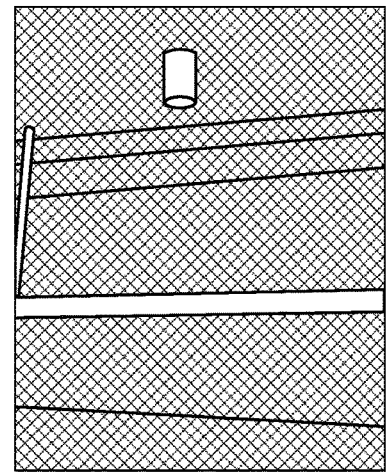
Figure 17D:
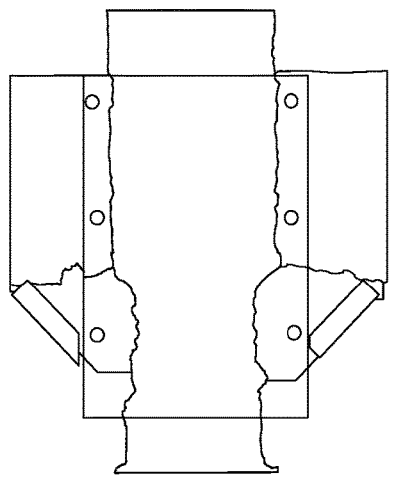
Figure 17E:
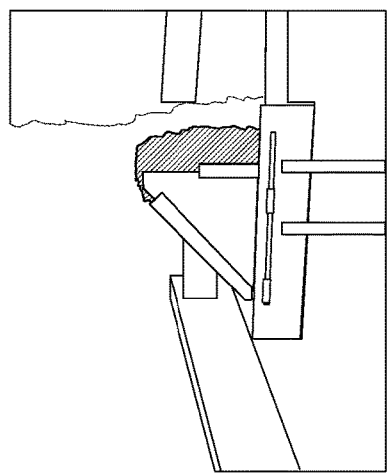
Figure 17F:
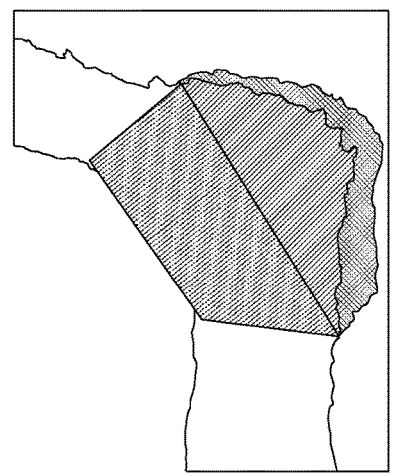

After curing, specimens IJ-C150FM and IJ-C150FMN were strengthened by chamfers using the repair mortar determined through Example 1, above. Two different strengthening methods including fixed formwork method and lifting formwork method were applied in strengthening work of specimens IJ-C150FM and IJ-C150FMN, respectively. The procedure of strengthening works is listed as follows and depicted in FIGS. 17A-17F:

1. Concrete cover of beams and columns with $L_C$ from joint is removed (FIG. 17A).
2. Surface of exposed concrete is chiseled by an impact hammer and is then cleaned by compressed air (FIG. 17B).
3. Surface of exposed concrete is dampened and painted by primer (FIG. 17C).
4. For specimen IJ-C150FM, formwork is fixed on the specimen. The repair mortar is cast into the formwork and compacted by a wooden hammer (FIG. 17D). For specimen IJ-C150FMN, the repair mortar is cast and compacted by hammering the formwork. The formwork is then lifted until the repair mortar contacts bottom of the beam (FIG. 17E).
5. The formwork is dismantled 24 hours after casting (FIG. 17F).

The compressive strength of the repair mortar of each of specimens IJ-C150FM and IJ C150FMN are 32.0 and 43.7 MPa, respectively. The strength was measured using 70 mm cubes one day before the quasi-static test.

Figure 18:
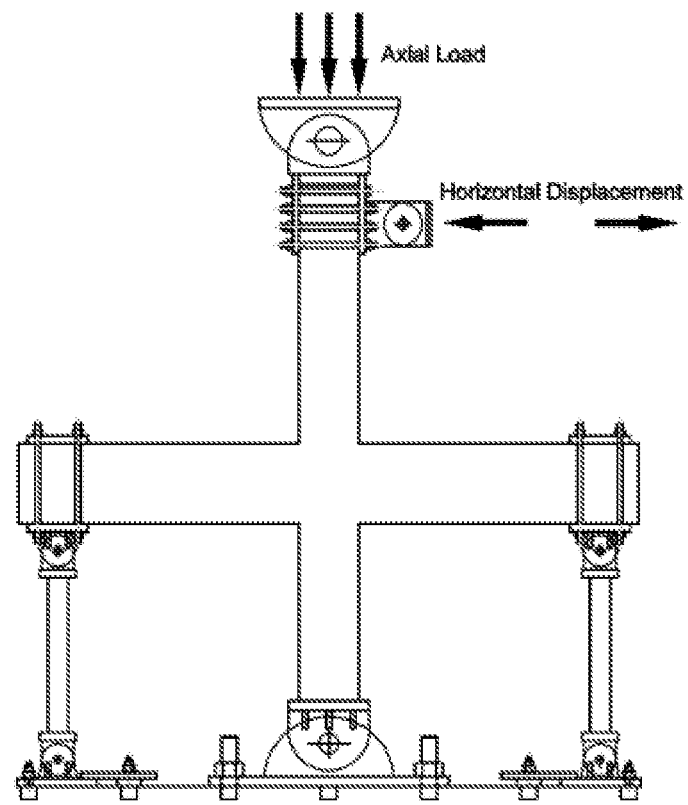
FIG. 18 schematically depicts the test apparatus of cyclic loading test on a beam-column joint.

FIG. 18 depicts the test set-up. The bottom of the lower column was fixed on a hinge support and free to rotate. The ends of the beams were supported by steel rollers. Strain gauges were installed on the surface of the chamfers, longitudinal reinforcements, and stirrups close to the joint area. A pair of LVDTs was installed diagonally in the joint to measure shear deformation.

Figure 19:
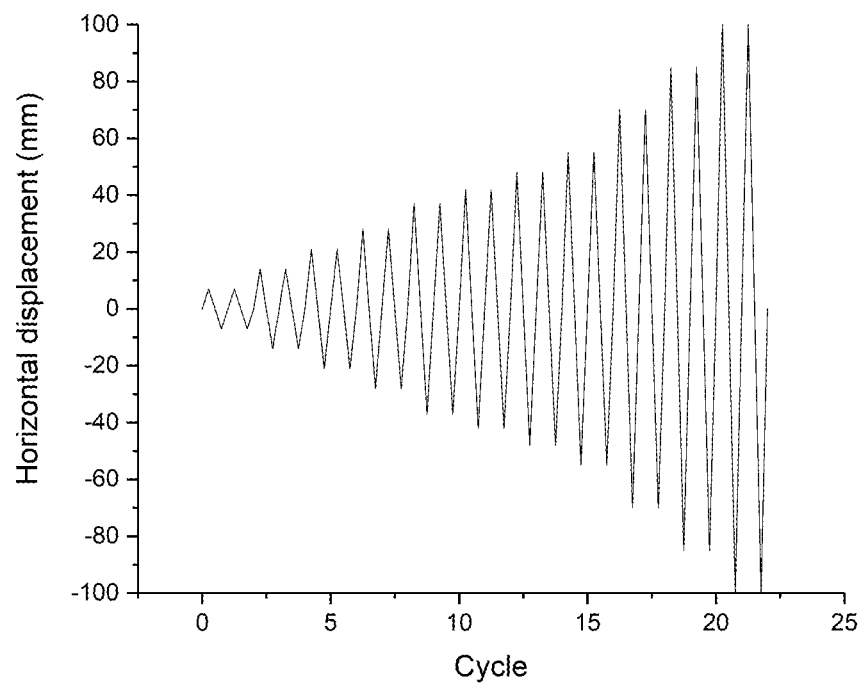
FIG. 19 is a plot depicting the cyclic horizontal loading test.

First, an axial load of 0.25 $f_{cu}A_g$ was applied vertically at the upper column and kept constant throughout the test. Here, $f_{cu}$ is the compressive strength of concrete and $A_g$ is gross cross-sectional area of the column. After imposing the axial load, each specimen was tested under reversed horizontal displacement. Horizontal loading was applied according to the loading scheme shown in FIG. 19. Cyclic loading was repeated twice at each displacement increment. The test terminated when the horizontal loading reduced to 85% of the maximum.

Failure Mode:

Flexural cracks of specimen IJ-NC were first observed in the beams. Several vertical cracks then appeared in the joint. Subsequently, diagonal cracks appeared in the joint at a drift ratio of 0.82%. Drift ratio is defined as the ratio of horizontal displacement at the tip of the upper column to the overall length of column (2600 mm). With progressive increase in the drift ratio, more flexural cracks emerged on the beams and existing cracks propagated. Shear cracks intersected at the center of joint area. However, only three cracks were observed on the lower column throughout the loading history. It is due to the beneficial effect of column axial load that reduced tensile stress and suppressed the crack formation on the columns. When the load reached its peak, diagonal cracks fully developed in joint area, as shown in FIGS. 20A and 20B. Specimen IJ-NC failed due to joint shear failure. Under the reversed cyclic load, repeated opening and closing of diagonal cracks on the joint accelerated spalling of joint cover at the post-peak stage.

FIG. 21 shows the crack pattern and failure mode of specimen IJ-SP. Flexural cracks were first observed at the beams. The first diagonal crack was found in the joint when the drift ratio reached 0.53%. As the lateral displacement increased, the flexural cracks increased and spread towards neutral axis of beams. Increasing shear cracks appeared in the joint area and intersected with each other. When the drift ratio reached 2.7%, the specimen IJ-SP reached its peak load. Stirrups yielded and shear cracks fully developed in joint area. Specimen IJ-SP failed due to shear failure of joint. Concrete cover spalled in the joint at post-peak stage.

Figure 22:
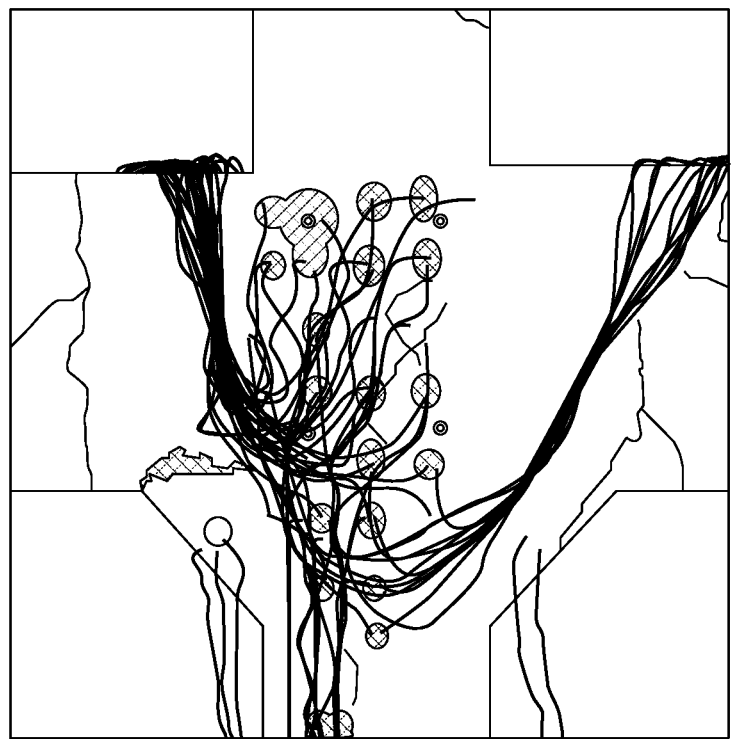
FIG. 22 shows the crack pattern of and failure mode of a beam-column joint with chamfers.

FIG. 22 shows the crack pattern of specimen U-C150FM. The first flexural crack was formed at the bottom of beams. When drift ratio increased to 0.63%, cracks appeared at the junction of the column and chamfers. As the drift ratio increased, the cracks extended upward and separated the chamfers from the column. Large quantities of diagonal cracks connected and intersected in the center of the joint area. When the drift ratio increased to 1.91%, specimen U-C150FM approached its peak strength. Cracks were observed parallel to the hypotenuse (diagonal surface) of the chamfers when the chamfers were under compression. Specimen IJ-C150FM failed due to shear failure of joint and compressive failure of chamfers. Concrete cover spalled in the joint at post-peak stage.

Figure 23:
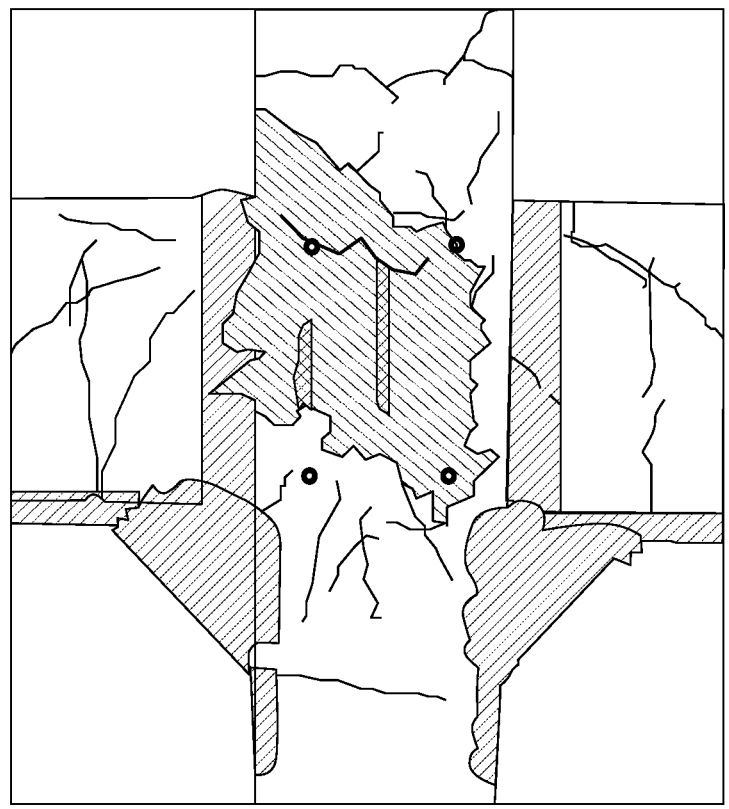
FIG. 23 shows the crack pattern of and failure mode of a further beam-column joint with chamfers.

FIG. 23 shows the crack pattern of specimen U-C150FMN. Flexural cracks were first observed at the beams. Cracks then appeared at the junction of the column and the chamfers when the drift ratio reached 0.56%. As the lateral displacement increased, shear cracks generated and propagated in the joint area. When the specimen reached its peak loading capacity, spalling of concrete cover was observed at the bottom of upper column and joint area. Similar to specimen U-C150FM, specimen U-C150FMN failed by a combination of shear failure of joint and compressive failure of chamfers.

Hysteretic Behavior:

Since a constant axial load was applied, a P-Δ effect was induced to the specimens and the effect could become significant under large drift ratio. The strengthening schemes may stiffen the specimens and thus a large horizontal force is responded in the stiffener specimen at the same displacement. For comparison, the P-Δ effect was determined and integrated into the hysteretic loops by the following equation.

$$P_h = P_{h0} + \frac{P_v \Delta}{l} \quad (1)$$

where, $P_h$ is the horizontal load considering the P-Δ effect; $P_{h0}$ is the horizontal load applied on the upper column; $P_v$ is vertical load; Δ is horizontal displacement; l is overall length of the column.

All the interior beam-column joint specimens failed due to shear failure of the joint. The shear strength of joint is linked to the strength of the concrete. In order to eliminate the effect of different concrete strengths, the horizontal load is normalized by the following equation.

$$P_{h,e} = P_h \sqrt{\frac{f_{cu,SP}}{f_{cu,X}}} \quad (2)$$

where, $P_{h,e}$ is equivalent horizontal load; $f_{cu,SP}$ and $f_{cu,X}$ are compressive strength of concrete of specimen IJ-SP and specimen X, respectively.

Figure 24:
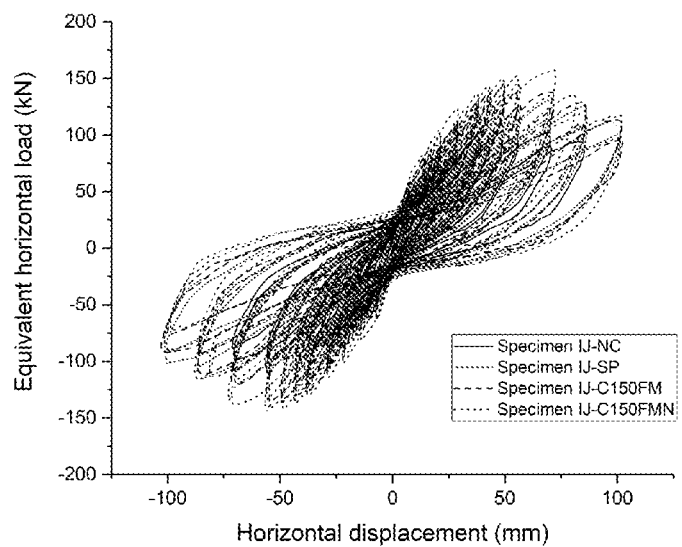
FIG. 24 shows plots of an equivalent horizontal load versus displacement at a column tip.

Plots of the equivalent horizontal load versus displacement at the column tip are shown in FIG. 24. Compared with control specimen IJ-NC, specimens IJ-C150FM and IJ-C150FMN achieved higher peak load and higher stiffness due to the beneficial effect of chamfers. The strengthened specimens also experienced larger degeneration of stiffness in the post-peak stage because both the joint and the chamfers failed.

Figure 25:
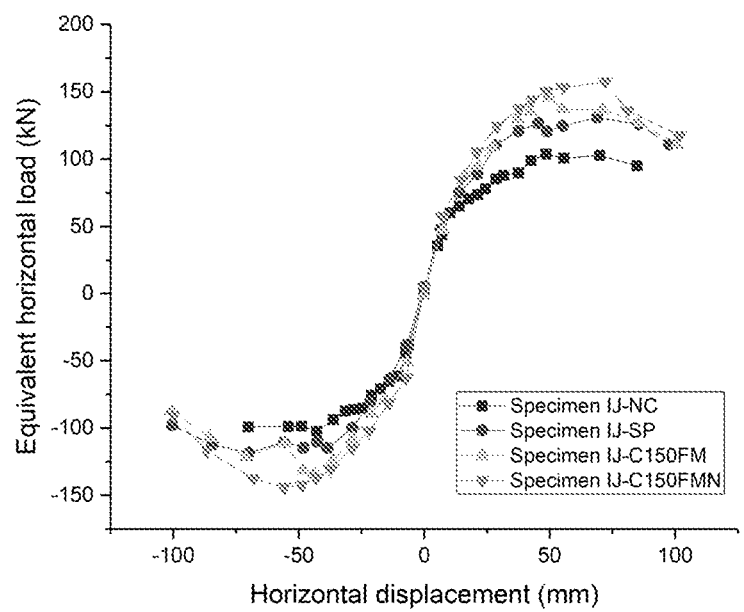
FIG. 25 shows envelopes of the hysteretic loops of specimens against equivalent horizontal force.

FIG. 25 shows envelopes of the hysteretic loops of specimens against equivalent horizontal force. At the initial stage, all the envelopes are close to each other. When the horizontal load exceeded 70 kN, the control specimen suffered progressive increase in horizontal displacement, while the other specimens maintained their stiffness. Specimen IJ-C150FMN exhibited the highest loading capacity, followed by specimens IJ-C150FM and IJ-SP. The control specimen IJ-NC ranked last.

Table 14 shows peak values of equivalent horizontal force. Different from the control specimen, peak loads of specimens IJ-SP, IJ-C150FM and IJ-C150FMN in the pull direction were larger than those in the push direction. This is because cracks propagated in the concrete under a pulling load. When the horizontal load turned to the push direction, cracked specimens cannot reach the peak load in the pull direction. Stirrups effectively improve horizontal loading capacity of the beam-column joint. Compared with control specimen, average peak value of specimen IJ-SP was increased by 21%. Although bonding failure occurred between the column and the chamfers, the chamfers can transfer load under compression and improve shear capacity of the beam-column joint. Peak load of IJ-C150FM was increased by 36% as compared with that of control specimen and was 12% more than that of specimen IJ-SP. Additionally, the average peak value of specimen IJ-C150FMN is slightly higher than that of specimen IJ-C150FM. This is probably attributed to the higher strength of chamfers cast using lifting formwork in specimen IJ-C150FMN.

TABLE 14

Peak values of equivalent horizontal force (kN)

| Specimen | Pull → | Push ← | Average | Enhancement |
|---|---|---|---|---|
| IJ-NC | 103.8 | −102.4 | 103.1 | — |
| IJ-SP | 130.9 | −118.5 | 124.7 | 21.0% |
| IJ-C150FM | 146.4 | −134.0 | 140.2 | 36.0% |
| IJ-C150FMN | 157.4 | −144.0 | 150.7 | 46.2% |

Stiffness Degradation

Figure 26:
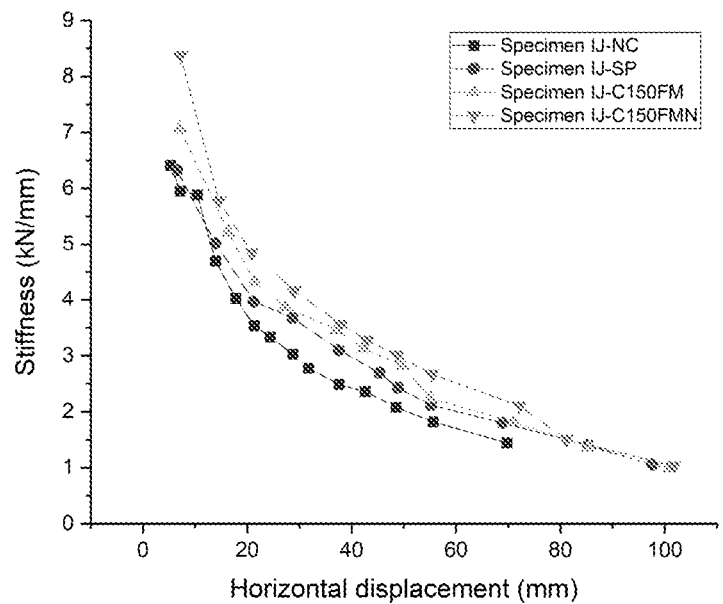
FIG. 26 is a plot of stiffness vs. horizontal displacement.

Stiffness of a specimen is defined as the slope of a line connecting the maximum equivalent load under reversed horizontal load in each hysteresis loop, as shown in FIG. 26. All the specimens degraded in stiffness with increasing load. At the initial stage of the test, specimen IJ-C150FMN shows the highest stiffness, followed by specimen IJ-C150FM. Specimen IJ-SP ranks the third and control specimen exhibits the lowest stiffness. In the first hysteresis loop, the stiffness of specimen IJ-C150FMN was 18% higher than that of specimen IJ-C150FM. As cracks formed and propagated between the column and the chamfers, the difference of stiffness between specimens IJ-C150FMN and IJ-C150FM got close. Compared with the control specimen, specimen IJ-SP shows similar stiffness at the initial stage, while higher stiffness at the post-peak stage. It is because the stirrups hinder the development of the diagonal crack in the joint and result in lower horizontal deformation in specimen IJ-SP.

Strain of Chamfers

Figure 27:
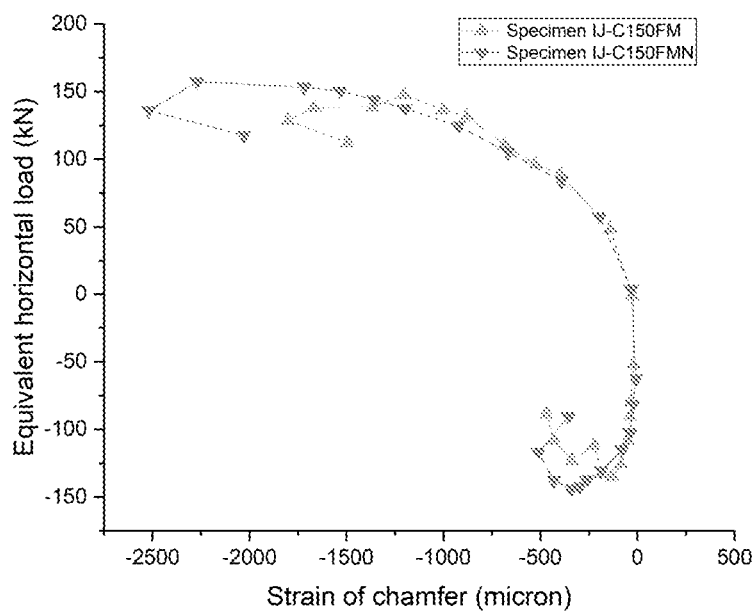
FIG. 27 is a plot of equivalent horizontal load vs. strain of the chamfer.

Strain gauges were installed at the centroid of chamfers to measure the strain of PHMRM parallel to the hypotenuse of chamfers. FIG. 27 shows the strain of chamfers of the strengthened specimens. The chamfers were subjected to compressive strain throughout the test due to axial load on beam-column joint specimens. The compressive strain of chamfers increased rapidly with increasing positive horizontal displacement. When the test terminated, chamfers of specimens IJ-C150FM and IJ-C150FMN reached compressive strain of 0.0018 and 0.0025, respectively. The higher strength of the repair mortar cast by lifting formwork in the latter specimen contributes to higher compressive strain. When both specimens were subjected to negative horizontal displacement, the chamfers showed small strain at pre-peak stage, indicating that weak bonding between the column and the chamfers failed to transfer stress.

Shear Distortion

Figure 28:
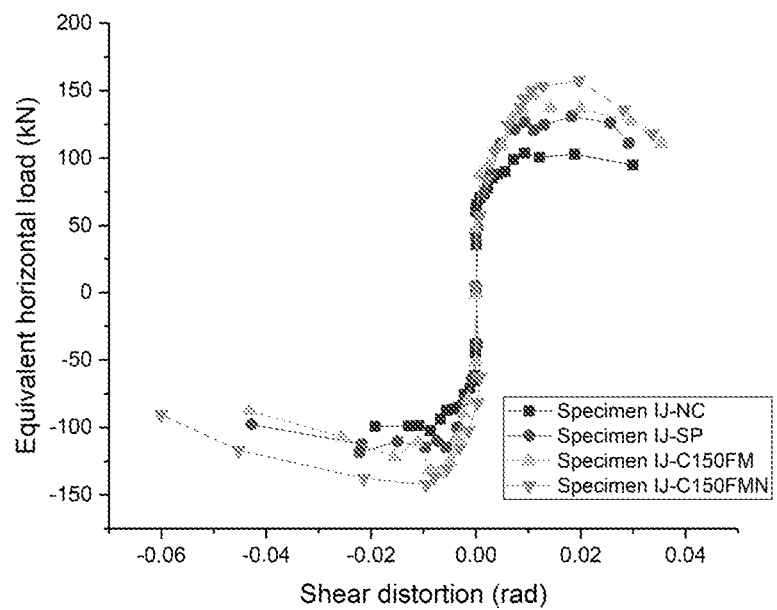
FIG. 28 shows the shear distortion of the joint region under different horizontal displacements.

The shear distortion of the joint region under different horizontal displacements is shown in FIG. 28. At the initial stage, shear strain kept at a negligible level less than $10^{-3}$ rad. When the horizontal load exceeded 74 kN, shear cracks were observed at joint region of control specimen and its shear strain increased markedly. When the control specimens reached their peak strength, a large number of shear cracks formed and developed in the joint, with sharp increase of shear strain. Specimen IJ-SP showed much smaller shear strain in joint region compared with control specimen. Stirrups hindered the development of diagonal cracks in the joint. After the stirrups yielded, shear distortion of specimen IJ-SP increased rapidly. Strengthened specimens IJ-C150FM and IJ-C150FMN exhibited high stiffness of the joint in the pre-peak stage, which profited from chamfers. However, shear strain increased sharply in the strengthened specimens in the post-peak stage due to shear failure of the joint.

Energy Dissipation

Figure 29:
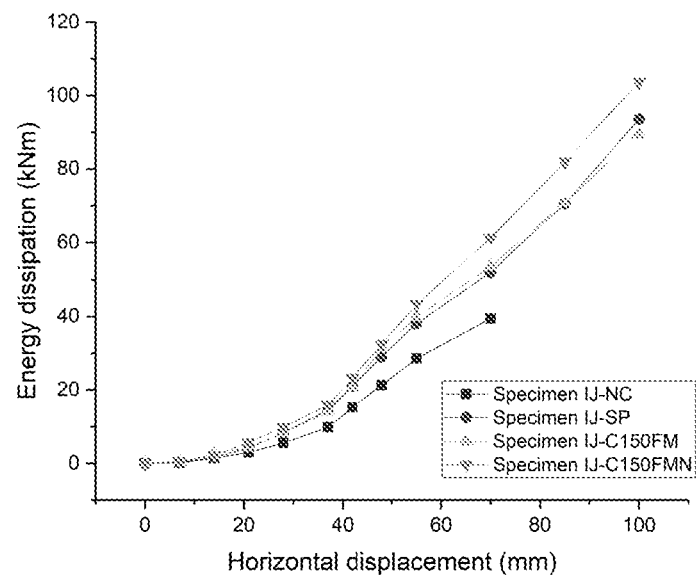
FIG. 29 shows energy dissipation of beam-column joints under different horizontal displacements.

FIG. 29 shows energy dissipation of beam-column joints under different horizontal displacement. The energy dissipation is obtained by accumulation of the area of hysteresis loops. Specimens strengthened by chamfers and the specimen with seismic provision had higher energy dissipation than the control specimen, which benefited by stirrups in the joint and the chamfers, respectively. Compared with control specimen, specimens IJ-C150FM and IJ-SP increased energy dissipation by 32% and 36%, respectively, while specimen IJ-C150FMN showed the highest improvement of 55% at horizontal displacement of 70 mm. The difference in energy dissipation between IJ-C150FM and IJ-C150FMN is ascribed to the higher strength of chamfers in the latter.

Seismic Performance of Exterior Beam-Column Joints Strengthened by Chamfers

Exterior beam-column joint specimens were prepared and strengthened by chamfers using the repair mortar determined in Example 1. Quasi-static load tests were performed to evaluate the seismic behavior of the specimens with and without chamfers. This part will describe specimens and chamfers for strengthening, followed by test setup and results. The failure modes, hysteretic loops, peak loads of specimens and strain gauge results are presented. Effect of PHMRM chamfers on the seismic performance of BCJs will be examined.

Preparation and Strengthening of Exterior BCJ Specimens

Figure 30:
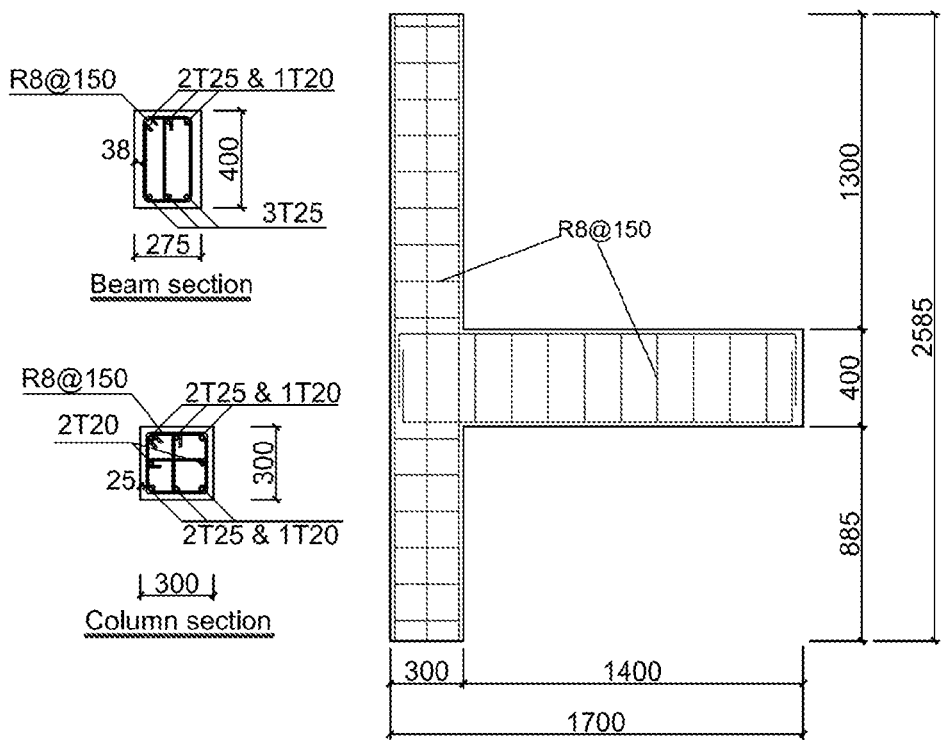
FIG. 30 shows the dimensions and reinforcement details of an exterior beam-column joint without transverse reinforcements.
Figure 31:
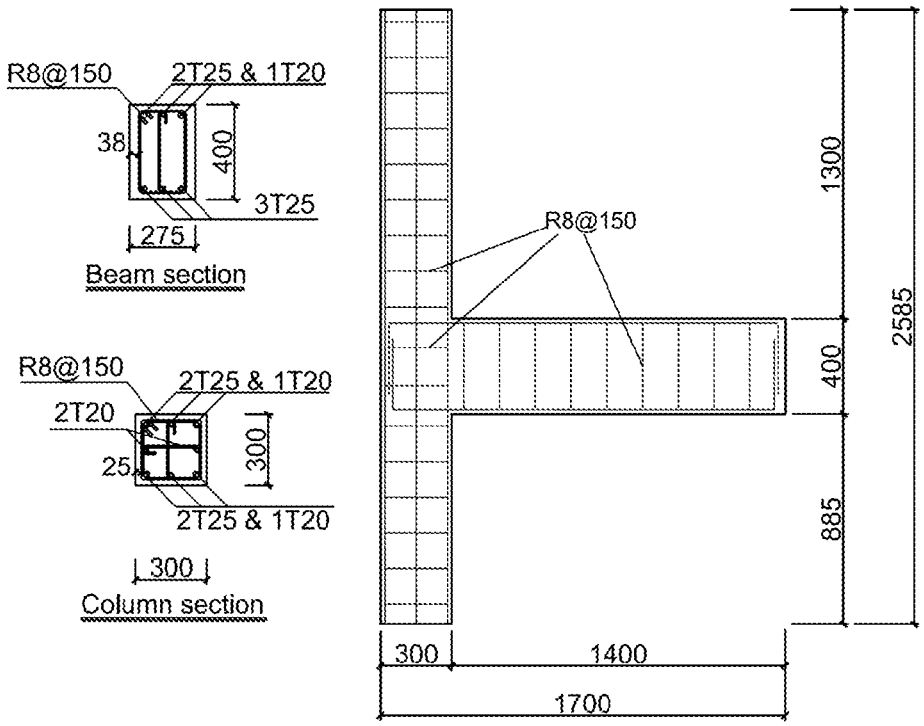
FIG. 31 shows the dimensions and reinforcement details of an exterior beam-column joint with transverse reinforcements.
Figure 32:
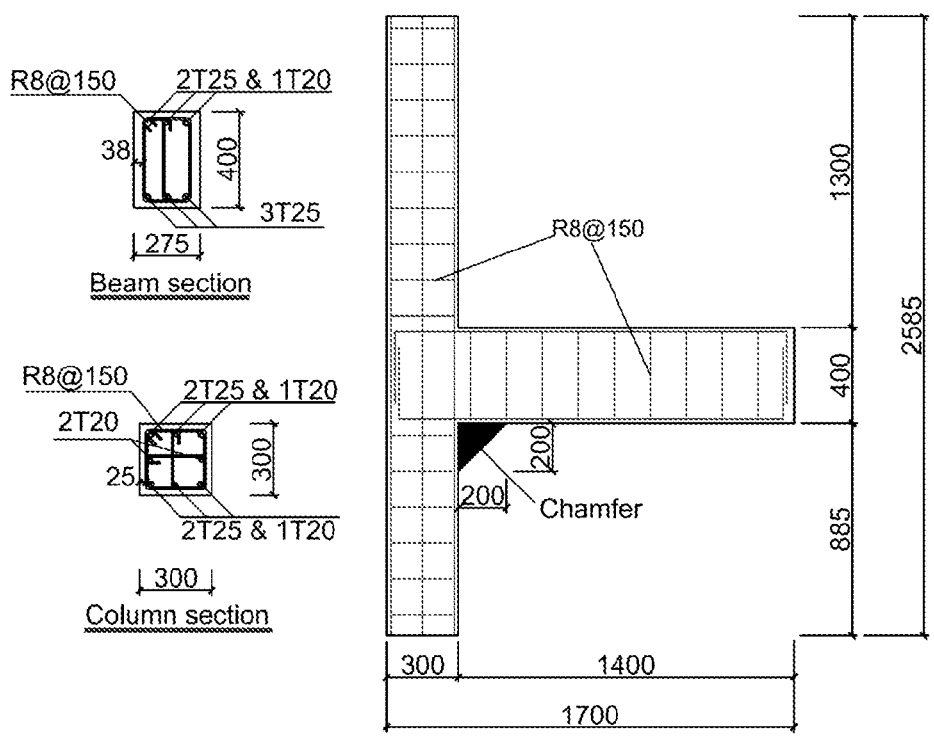
FIG. 32 shows the dimensions and reinforcement details of an exterior beam-column joint with a chamfer.

Three exterior beam-column joint specimens ("EJ-NC", "EJ-SP", and "EJ-C200FMN") were prepared. The control specimen EJ-NC represents an exterior beam-column joint without chamfers. The specimen EJ-SP represents an exterior beam-column joint designed according to seismic requirement of Hong Kong Concrete Code 2013. A pair of stirrups R8 was adopted as joint shear reinforcement in specimen EJ-SP. The specimen EJ-C200FMN represents a beam-column joint strengthened by a chamfer with a dimension of 200 mm, i.e., $L_C$ to $L_{BC}$ ratio of 0.67 (Table 15). Dimension and reinforcement details of specimens are given in FIGS. 30-32. The columns are 2585 mm in height with a cross section of 300 mm×300 mm. The beams are 1400 mm long with a cross section of 275 mm×400 mm. Deformed bars T20 and T25 are used as longitudinal reinforcements. Concrete cover is 25 mm to stirrups.

TABLE 15

Details of exterior BCJ specimens

| ID of specimen | Shear reinforcements in joint | Chamfers |
|---|---|---|
| EJ-NC | Without | Without |
| EJ-SP | A pair of R8 | Without |
| EJ-C200FMN | Without | A chamfer with size of 200 mm was cast using lifting formwork |

Similar to the interior beam-column joint specimens, ready-mixed concrete C30 with a slump of 150 mm was used. All specimens are cured in air after demolding. The compressive strength of concrete "$f_{cu}$" of each specimen was measured using 100 mm cubes one day before the quasi-static test, as listed in Table 16. After curing, specimen EJ-C200FMN was strengthened by a chamfer using the lifting formwork method.

TABLE 16

| Compressive strength of concrete (MPa) | | | |
|---|---|---|---|
| Specimen | EJ-NC | EJ-SP | EJ-C200FMN |
| $f_{cu}$ | 44.1 | 35.2 | 33.2 |

Figure 33:
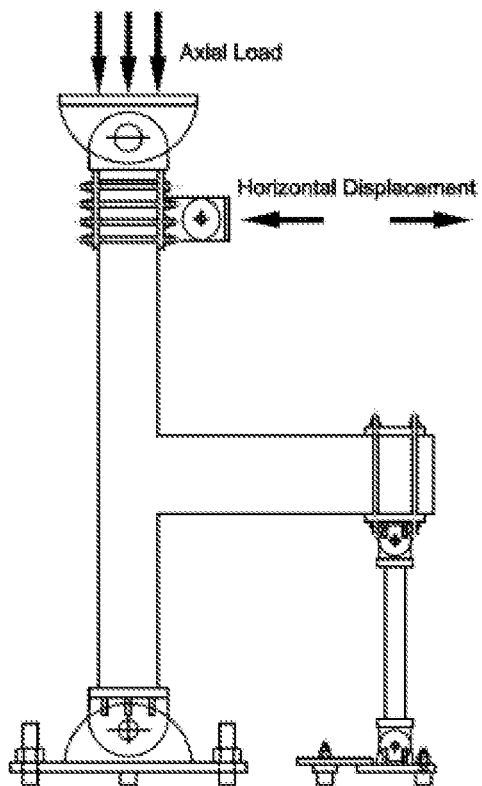
FIG. 33 shows the test set-up of cyclic loading test on an exterior beam-column joint.

FIG. 33 shows the test set-up on an exterior beam-column joint. The bottom of the lower column was fixed on a hinge support and free to rotate. The end of the beam was supported by one steel roller. Strain gauges were installed on the surface of chamfers, longitudinal reinforcements, and stirrups close to the joint area. A pair of LVDTs was installed diagonally in the joint to measure shear deformation.

Figure 34:
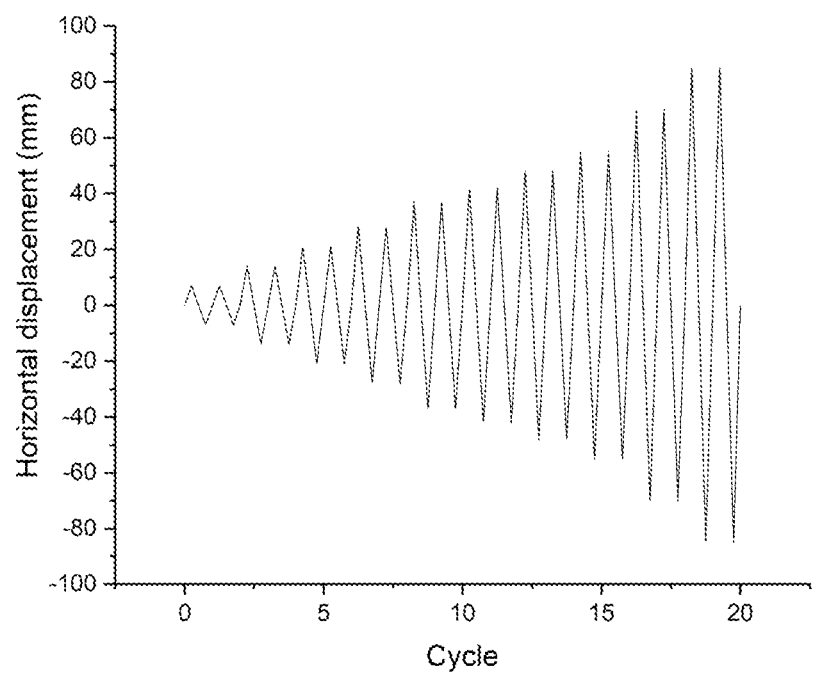
FIG. 34 graphically depicts the horizontal loading applied to the exterior beam-column joints.

The procedure of the quasi-static test on exterior beam-column joints is similar to that of interior beam-column joints. An axial load of 0.25 $f_{cu}A_g$ was kept constant throughout the test. After imposing the axial load, each specimen was tested under reversed horizontal displacement. Horizontal loading was applied according to the loading scheme shown in FIG. 34. Cyclic loading was repeated twice at each displacement increment.

Failure Mode

Figure 35:
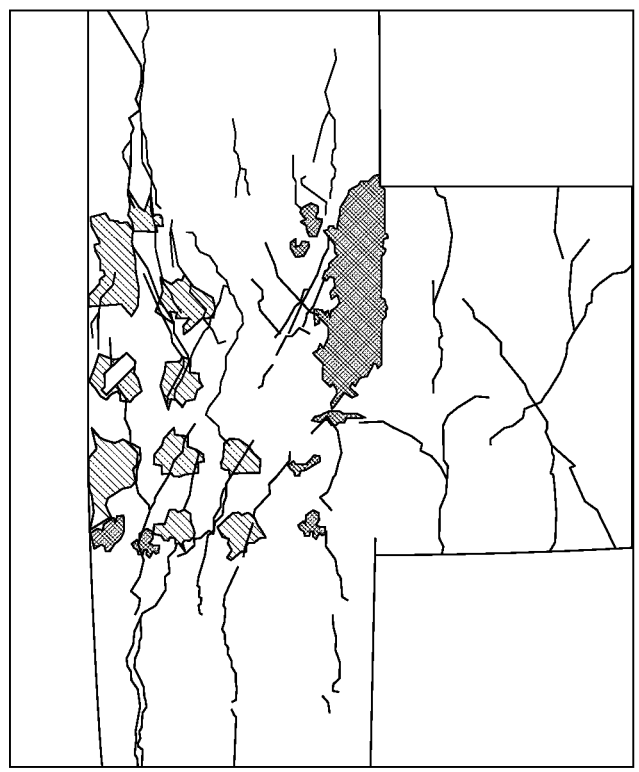
FIG. 35 depicts the crack pattern and the failure mode of an exterior beam-column joint without transverse reinforcements.

Flexural cracks of specimen EJ-NC were first observed in the bottom of the beam. Several vertical cracks then appeared in the joint and the top of the beam. Subsequently, diagonal cracks appeared in the joint at a drift ratio of 0.78%. With progressive increase in the drift ratio, more flexural cracks emerged on the beams and existing cracks propagated. Shear cracks intersected at the center of joint area and propagated to both the upper column and lower column. When the horizontal force reached its peak, diagonal cracks fully developed in the joint zone, indicating that specimen EJ-NC failed due to shear failure in joint. Under the reversed cyclic load, repeated opening and closing of diagonal cracks on the joint accelerated spalling of joint cover at the post-peak stage, as shown in FIG. 35.

Figure 36:
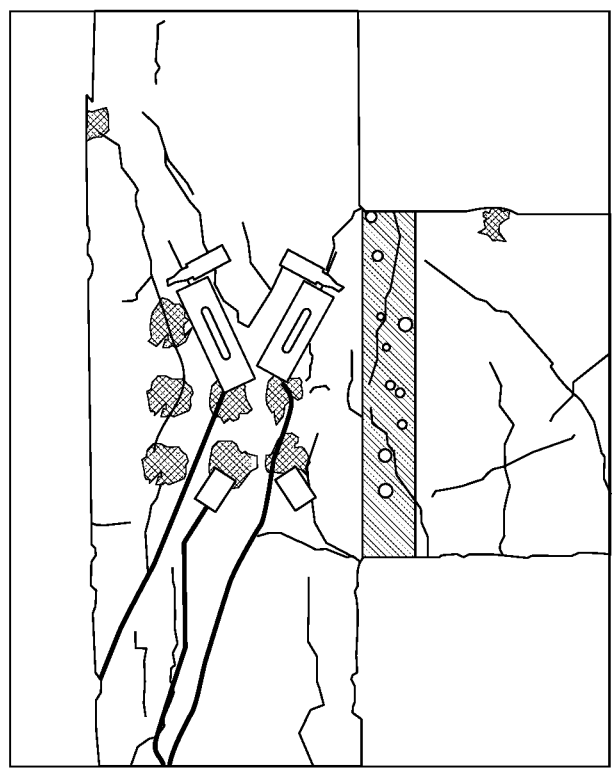
FIG. 36 depicts the crack pattern and the failure mode of an exterior beam-column joint with transverse reinforcements.

The crack pattern of specimen EJ-SP was similar to that of specimen EJ-NC. Flexural cracks appeared first in the bottom of the beam and then in the top of the beam. Subsequently, diagonal cracks appeared in the joint at a drift ratio of 0.81%. With an increase in the drift ratio, the flexural cracks increased and developed towards the neutral axis of the beam. Shear cracks intersected at the center of the joint area and propagated to column. Due to the stirrups in the joint, the number of diagonal cracks in specimen EJ-SP was fewer than that in the control specimen (FIG. 36). When the drift ratio exceeded 1.43%, loading capacity of specimen EJ-SP declined due to shear failure of the joint. Stirrups did not yield in the joint of specimen EJ-SP.

Figure 37:
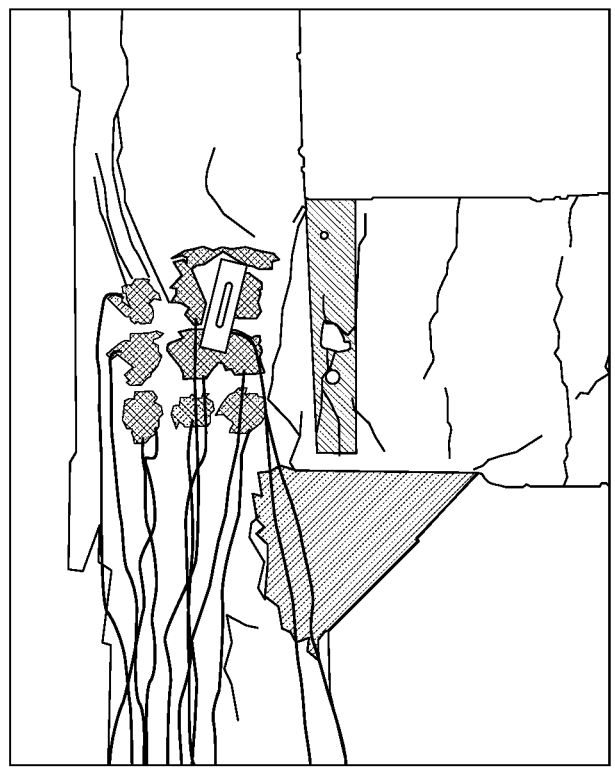
FIG. 37 depicts the crack pattern and the failure mode of an exterior beam-column joint with chamfers.

FIG. 37 depicts the crack pattern and failure mode of specimen EJ-C200FMN. Flexural cracks were first observed at the beam. When the drift ratio reached 0.52%, a crack appeared at the junction of the beam and the chamfer. With increasing drift ratio, the crack extended horizontally and separated the chamfer from the beam. Meanwhile, diagonal cracks formed and propagated in the center of the joint. When the specimen reached its peak strength, numerous diagonal cracks intersected with each other in the joint area. Specimen EJ-C200FMN failed due to shear failure in the joint. At post-peak stage, the shear cracks extended to column. The concrete cover of the lower column opposite to the beam spalled and exposed main reinforcements. Different from those of specimens IJ-C150FM and IJ-C150FMN, no crack was observed in the chamfer of EJ-C200FMN.

Hysteretic Behavior

Figure 38:
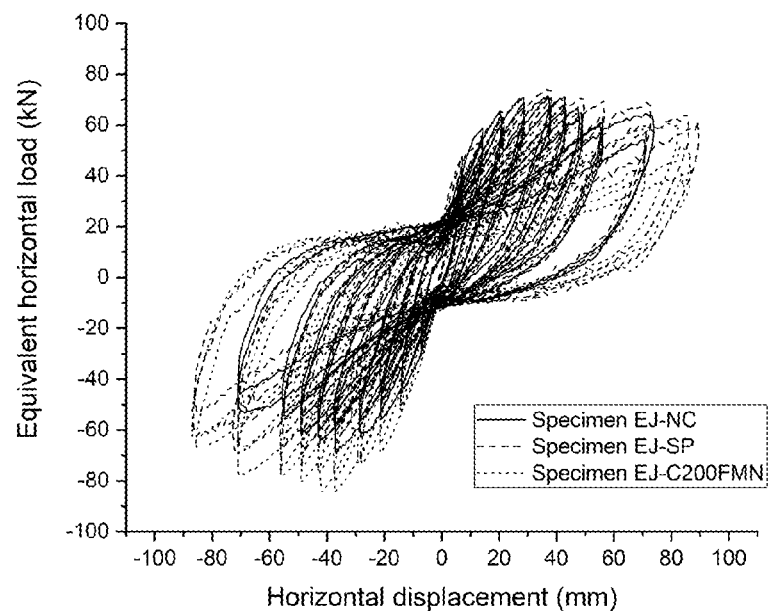
FIG. 38 is a plot of horizontal load-displacement relationships of exterior beam-column joints.
Figure 39:
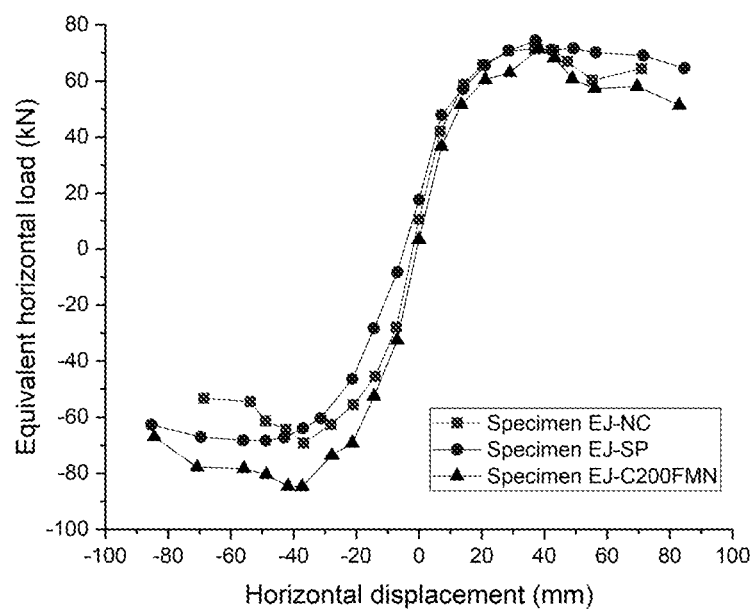
FIG. 39 shows envelopes of the hysteretic loops of exterior beam-column joint specimens against equivalent horizontal force.

Horizontal load-displacement relationships of exterior beam-column joints are shown in FIG. 38. Different from specimens EJ-NC and EJ-SP, specimen EJ-C200FMN performed asymmetrically in reverse directions under cyclic load. The hysteretic loop of specimen EJ-C200FMN was slimmer than those of other two specimens at post-peak stage. FIG. 39 shows envelopes of the hysteretic loops of exterior beam-column joint specimens against equivalent horizontal force. All the exterior beam-column joint specimens exhibited close loading capacities under positive horizontal displacement, while specimen EJ-C200FMN showed higher peak strength than specimens EJ-NC and EJ-SP under negative horizontal displacement. Due to the stirrups in the joint, the specimen EJ-SP suffered less deterioration in loading capacity in post-peak stage than other specimens.

Table 17 shows peak values of equivalent horizontal force of exterior beam-column joint specimens. Specimen EJ-SP had close loading capacity as compared with the control specimen in both directions of horizontal loading. The seismic provision in the joint of specimen EJ-SP seems to play little role in improvement of seismic behavior. In contrast, specimen EJ-C200FMN showed almost the same peak load as the control specimen under positive horizontal displacement (i.e., the pull direction), while it improved by 22.3% in peak load than the control specimen under negative horizontal displacement (i.e., the push direction). The difference in seismic performance of specimen EJ-C200FMN is ascribed to effectiveness of the chamfer in transmission of load under opposite horizontal displacement. The chamfer at the beam soffit was subjected to tensile load under positive horizontal displacement. Insufficient bonding between the beam and chamfer failed to carry the tensile load. The chamfer separated from the beam and lost its contribution to loading capacity of specimen EJ-C200FMN. However, when the horizontal displacement was negative, the chamfer succeeded to resist compression and thus improve the horizontal loading capacity of beam-column joint specimen.

TABLE 17

Peak values of equivalent horizontal force of exterior BCJ specimens (kN)

| Specimen | Pull → | Enhancement | Push ← | Enhancement |
|---|---|---|---|---|
| EJ-NC | 71.3 | — | −69.2 | — |
| EJ-SP | 74.4 | 4.3% | −68.3 | −1.3% |
| EJ-C200FMN | 71.4 | 0.1% | −84.6 | 22.3% |

Figure 40:
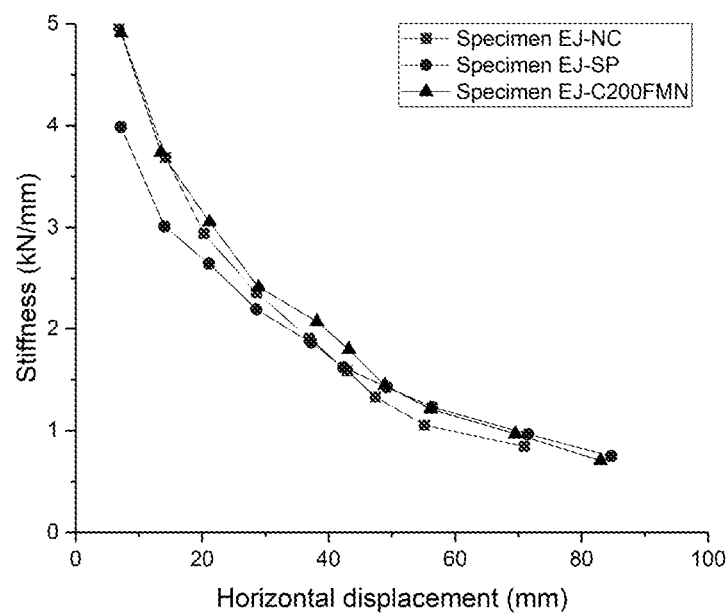
FIG. 40 is a plot of stiffness vs. horizontal displacement of test specimens.

Stiffness of specimens is shown in FIG. 40. All the specimens degraded in stiffness with increasing drift ratios. Due to the chamfer, the strengthened specimen EJ-C200FMN was found stiffer than the other specimens in pre-peak stage although it had the lowest strength of concrete. Specimen EJ-SP showed lower stiffness than control specimen in pre-peak stage due to the lower strength of concrete. As the drift ratio increased, shear cracks propagated in the joint and significantly reduced the stiffness of the control specimen. In contrast, stirrups hindered the development of shear cracks in the joint, which alleviated the degradation of stiffness of specimen EJ-SP. This explains the phenomenon that stiffness of specimen EJ-SP was higher than that of the control specimen in the post-peak stage.

Figure 41:
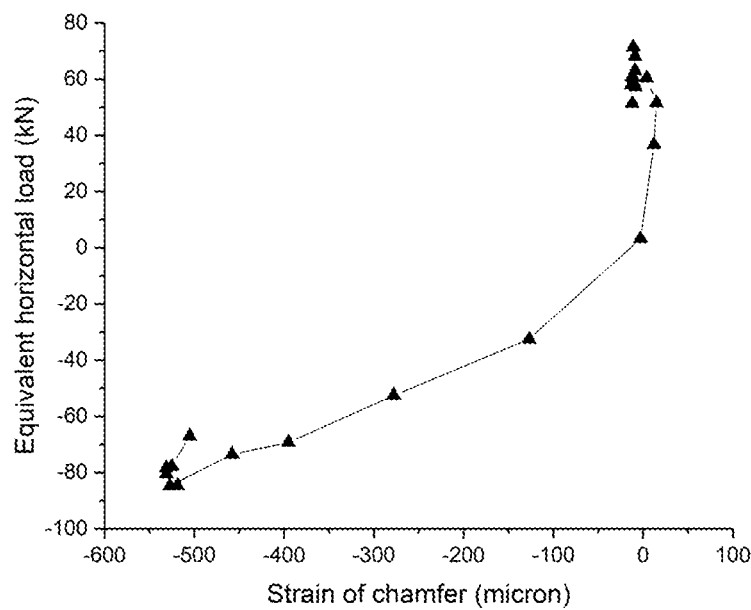
FIG. 41 shows the strain of the chamfer of the chamfer-strengthened specimens.

Strain gauges were installed at the centroid of the chamfer of specimen EJ-C200FMN to measure the strain of the repair mortar parallel to the hypotenuse (diagonal surface) of chamfers. FIG. 41 shows the strain of the chamfer of the strengthened specimen. The chamfer can transfer the tensile load before positive the horizontal load reached 52 kN. After that, the tensile strain gradually decreased in the chamfer, which may be attributed to de-bonding between the chamfer and the beam. The compressive strain of the chamfers increased rapidly, up to 0.0005 under negative horizontal loading. The peak compressive strain of the chamfer in specimen EJ-C200FMN was much less than that in specimens IJ-C150FM and IJ-C150FMN, probably due to the larger dimension of the chamfer.

Figure 42:
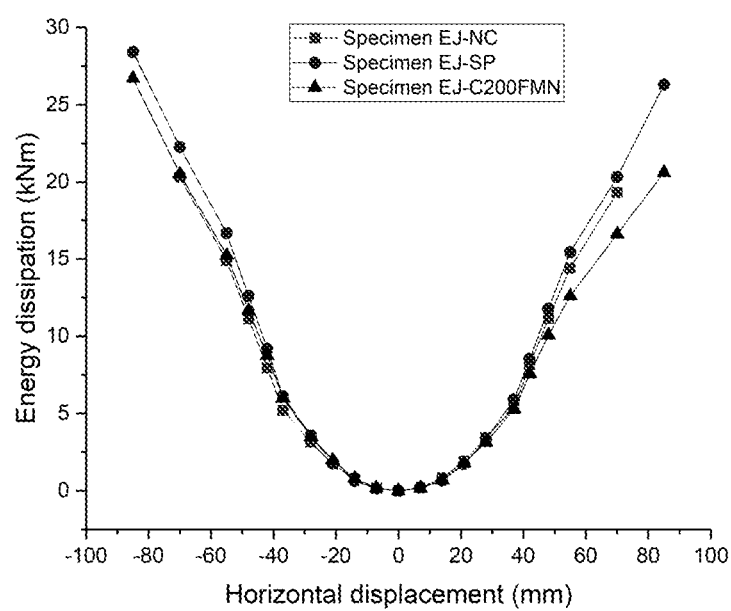
FIG. 42 shows the energy dissipation of beam-column joints under different horizontal displacements.

FIG. 42 shows the energy dissipation of beam-column joints under different horizontal displacement. The energy dissipation in the opposite direction of displacement is calculated respectively. Specimens EJ-SP and EJ-C200FMN showed higher energy dissipation than the control specimen in the pre-peak stage, which is attributed to improvement due to stirrups in the joint and the chamfer in loading capacity, respectively. In the post-peak stage, specimen EJ-SP showed slightly higher energy dissipation than the other specimens. This is because propagation of shear cracks was hindered by stirrups in joint of specimen EJ-SP.

Thus, as demonstrated by the Examples, a high-performance repair mortar was developed having high compressive and tensile strength and high bonding strength. Chamfers made from the repair mortar are installed at beam-column joints were extensively tested. As shown by the testing, chamfers made from the inventive repair mortars can provide higher horizontal loading capacity, stiffness, and energy dissipation to the beam-column joints. Both fixed formwork and lifting formwork may be used to for strengthening beam-column joints.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the specification, and following claims.

The invention claimed is:

1. A polymer-modified, hybrid fibers cementitious composition having a one-day compressive strength of at least approximately 17 MPa, a 28-day tensile strength of at least approximately 3.8 MPa, an ultimate tensile strain ranging from approximately 3% to approximately 9%, and a 7-day bond strength of at least approximately 2.3 MPa, the composition comprising:
 a binder including ordinary Portland cement, fly ash, and silica fume;
 limestone powder;
 sand;
 superplasticizer; and
 water;
 the composition further including polymer additives comprising one or more of styrene butadiene rubber or ethylene-vinyl acetate copolymer in an amount ranging between approximately 2% and approximately 8% by mass of binder, and fiber additives comprising steel fibers in an amount ranging between approximately 0.3% and approximately 3.0% by volume of the cementitious composition and polymer fibers in an amount ranging between approximately 0.8% and approximately 1.0% by volume of the cementitious composition.

2. The polymer-modified, hybrid fibers cementitious composition as recited in claim 1, wherein the fly ash is approximately 25% to approximately 35% by mass of the binder.

3. The polymer-modified, hybrid fibers cementitious composition as recited in claim 1, wherein the silica fume is approximately 5% by mass or less of the binder.

4. The polymer-modified, hybrid fibers cementitious composition as recited in claim 1, wherein the steel fibers have a diameter of at least approximately 160 microns.

5. The polymer-modified, hybrid fibers cementitious composition as recited in claim 1, wherein the polymer fibers have a diameter of approximately 0.025 mm or less.

6. The polymer-modified, hybrid fibers cementitious composition as recited in claim 1, wherein the superplasticizer is a polycarboxylate-based superplasticizer.

7. The polymer-modified, hybrid fibers cementitious composition as recited in claim 1, wherein the steel fibers are copper-coated steel fibers.

8. The polymer-modified, hybrid fibers cementitious composition as recited in claim 1, wherein the steel fibers have an average length greater than approximately 13 mm.

* * * * *